US011770540B2

(12) United States Patent
Zhang et al.

(10) Patent No.: US 11,770,540 B2
(45) Date of Patent: Sep. 26, 2023

(54) MULTIPLE HYPOTHESIS FOR SUB-BLOCK PREDICTION BLOCKS

(71) Applicants: Beijing Bytedance Network Technology Co., Ltd., Beijing (CN); Bytedance Inc., Los Angeles, CA (US)

(72) Inventors: Li Zhang, San Diego, CA (US); Kai Zhang, San Diego, CA (US); Hongbin Liu, Beijing (CN); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/316,390

(22) Filed: May 10, 2021

(65) Prior Publication Data

US 2021/0281859 A1 Sep. 9, 2021

Related U.S. Application Data

(63) Continuation of application No. PCT/CN2019/118130, filed on Nov. 13, 2019.

(30) Foreign Application Priority Data

Nov. 13, 2018 (WO) ................ PCT/CN2018/115183

(51) Int. Cl.
*H04N 19/176* (2014.01)
*H04N 19/146* (2014.01)
(Continued)

(52) U.S. Cl.
CPC ......... *H04N 19/176* (2014.11); *H04N 19/109* (2014.11); *H04N 19/146* (2014.11); *H04N 19/184* (2014.11); *H04N 19/567* (2014.11)

(58) Field of Classification Search
CPC .. H04N 19/176; H04N 19/146; H04N 19/184; H04N 19/567
(Continued)

(56) References Cited

U.S. PATENT DOCUMENTS 10,298,950 B2   5/2019   Wang et al.
10,609,367 B2   3/2020   Zhao et al.
(Continued)

FOREIGN PATENT DOCUMENTS

CN   102934440 A   2/2013
CN   104041047 A   9/2014
(Continued)

OTHER PUBLICATIONS

Huang et al. (CE4.2.5: Simplification of Affine Merge List Construction and Move ATMVP to Affine Merge List, Joint Video Experts Team "JVET" of ITU-TSG16 WP3 and ISO/IECJTC1/SC29/WG11, 12th Meeting, Macao, CN, Oct. 3-12, 2018) (Year: 2018).*
(Continued)

*Primary Examiner* — Ayman A Abaza
(74) *Attorney, Agent, or Firm* — Perkins Coie LLP

(57) ABSTRACT

A method of encoding or decoding video includes: dividing a current video block into multiple sub-blocks video blocks; generating a merge candidate list for at least one sub-blocks video blocks of the multiple sub-blocks video blocks; and performing a conversion between the video block and a bitstream of the video block based one the merge candidate list; wherein the merge candidate list comprises at least one merge candidate with multi-hypothesis mode.

13 Claims, 29 Drawing Sheets

(51) Int. Cl.
*H04N 19/184* (2014.01)
*H04N 19/567* (2014.01)
*H04N 19/109* (2014.01)

(58) Field of Classification Search
USPC .................................................. 375/240.12
See application file for complete search history.

(56) References Cited

U.S. PATENT DOCUMENTS

| | | | |
|---|---|---|---|
| 10,701,366 | B2 | 6/2020 | Chen et al. |
| 2013/0163669 | A1 | 6/2013 | Lim et al. |
| 2013/0195188 | A1 | 8/2013 | Sugio et al. |
| 2015/0131724 | A1 | 5/2015 | Lin et al. |
| 2016/0142729 | A1 | 5/2016 | Wang et al. |
| 2017/0132471 | A1 | 5/2017 | Scanlon et al. |
| 2017/0332099 | A1* | 11/2017 | Lee ............... H04N 19/122 |
| 2018/0098063 | A1 | 4/2018 | Chen et al. |
| 2018/0176582 | A1 | 6/2018 | Zhao et al. |
| 2018/0199054 | A1* | 7/2018 | Hsu ............... H04N 19/182 |
| 2018/0241998 | A1 | 8/2018 | Chen et al. |
| 2021/0051339 | A1 | 2/2021 | Liu et al. |
| 2021/0076063 | A1 | 3/2021 | Liu et al. |
| 2021/0092435 | A1 | 3/2021 | Liu et al. |
| 2021/0160527 | A1* | 5/2021 | Chuang ............ H04N 19/105 |

FOREIGN PATENT DOCUMENTS

| | | |
|---|---|---|
| CN | 104126302 A | 10/2014 |
| CN | 104584549 A | 4/2015 |
| CN | 107113424 A | 8/2017 |
| CN | 108353184 A | 7/2018 |
| CN | 108432250 A | 8/2018 |
| CN | 110301135 A | 10/2019 |
| WO | 2016034058 A1 | 3/2016 |
| WO | 2017076221 A1 | 5/2017 |
| WO | 2018127188 A1 | 7/2018 |

OTHER PUBLICATIONS

Bross et al. "Versatile Video Coding (Draft 2)," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K1001, 2018.
Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.
Chen et al. "CE4: Enhanced Merge Mode (Test 4.2.15)," Joint Video Experts Team (JVET) of ITU-T SG 16 WP 3 and ISO/IEC JTC 1/SC 29/WG 11, 11th Meeting, Ljublijana, SI, Jul. 10-18, 2018, document JVET-K0198, 2018.
Chen et al. "CE4: Affine Merge Enhancement (Test 4.2.2)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0368, 2018.
Chen et al. "Crosscheck of JVET-L0142 (CE4: Simplification of the Common Base for Affine Merge (Test 4.2.6))," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0632, 2018.
Han et al. "CE4.1.3: Affine Motion Compensation Prediction," Joint Video Exploration Team (JVET) of ITU-T SG 16 WP 3 and ISO/IEC JTC 1/SC 29/WG 11, 11th Meeting, Ljubljana, SI, 10-18, Jul. 2018, document JVET-K0337, 2018.
Huang et al. "CE4.2.5: Simplification of Affine Merge List Construction and Move ATMVP to Affine Merge List," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0278, 2018.
"Information Technology—High Efficiency Coding and Media Delivery in Heterogeneous Environments—Part 2: High Efficiency Video Coding" Apr. 20, 2018, ISO/DIS 23008, 4th Edition.
Li et al. "CE4-Related: Extension of Merge and AMVP Candidates for Inter Prediction," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0301, 2018.
Liao et al. "CE10.3.1.b: Triangular Prediction Unit Mode," Joint Video Exploration Team (JVET) of ITU-T SG 16 WP 3 and ISO/IEC JTC 1/SC 29/WG 11, 12th Meeting, Macao, CN, Oct. 3-12, 2018, document JVET-L0124, 2018.
Lee et al. "CE4: Simplification of the Common Base for Affine Merge (Test 4.2.6)," Joint Video Experts Team (JVET) of ITU-T SG 16 WP 3 and ISO/IEC JTC 1/SC 29/WG 11, 12th Meeting, Macau, CN, Oct. 8-12, 2018, document JVET-L0142, 2018.
Rosewarne et al. "High Efficiency Video Coding (HEVC) Test Model 16 (HM 16) Improved Encoder Description Update 7," Joint Collaborative Team on Video Coding (JCT-VC) ITU-T SG 16 WP3 and ISO/IEC JTC1/SC29/WG11, 25th Meeting, Chengdu, CN, Oct. 14-21, 2016, document JCTVC-Y1002, 2016.
JEM-7.0 httpsjvet.hhi.fraunhofer.desvnsvn_HMJEMSoftwaretags HM-16.6-JEM-7.0.
https://vcgit.hhi.fraunhofer.de/jvet/VVCSoftware_VTM/tags/VTM-2.1.
https://www.itu.int/rec/T-REC-H.265.
International Search Report and Written Opinion from International Patent Application No. PCT/CN2019/118128 dated Feb. 19, 2020 (12 pages).
International Search Report and Written Opinion from International Patent Application No. PCT/CN2019/118130 dated Jan. 31, 2020 (11 pages).
Chiang et al. "CE10.1.1: Multi-Hypothesis Prediction for Improving AMVP Mode, Skip or Merge Mode, and Intra Mode," Joint Video Experts Team (JVET) of ITU-T SG 16 WP 3 and ISO/IEC JTC 1/SC 29/WG 11 12th Meeting: Macao, CN, Oct. 3-12, 2018, document JVET-L0100, 2018. (cited in CN201980074019.1 dated May 22, 2023).

* cited by examiner

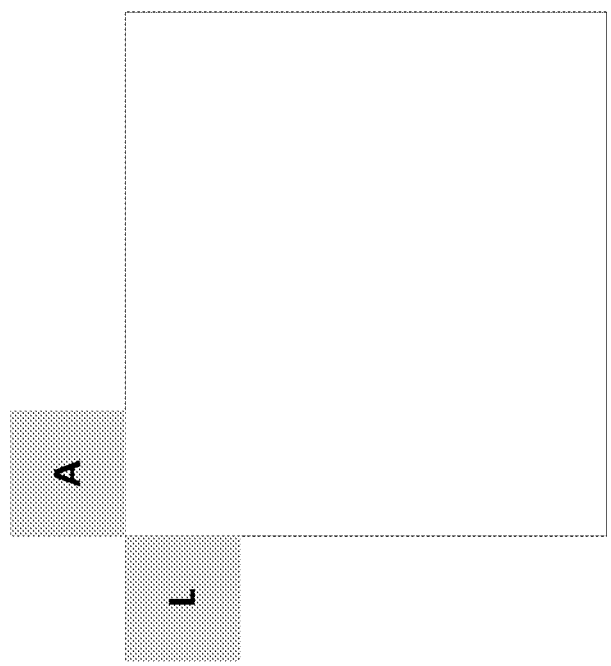

the HEVC-SCC extension Section
as follows. Section
general IBC techn
designs of IBC in th

FIG. 23

MULTIPLE HYPOTHESIS FOR SUB-BLOCK PREDICTION BLOCKS

CROSS-REFERENCE TO RELATED APPLICATION

This application is a continuation of International Application No. PCT/CN2019/118130 filed on Nov. 13, 2019, which claims the priority to and benefits of International Patent Application No. PCT/CN2018/115183, filed on Nov. 13, 2018. All the aforementioned patent applications are hereby incorporated by reference in their entireties.

TECHNICAL FIELD

This document is related to video coding technologies.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed techniques may be used by video decoder or encoder embodiments during video decoding or encoding using motion vectors.

In one example aspect, a video processing method is disclosed. The method includes inserting motion candidates in a motion candidate list of a video region of a video block using a list derivation rule, wherein the video region has a geometry shape that is a non-square and non-rectangular shape; and performing a conversion between the video block and a bitstream representation of the video block using the motion candidate list; wherein the list derivation rule comprises one or more selected from a group consisting of: rule 1: generating uni-prediction motion candidates from bi-prediction regular motion candidates using a non-scaled averaging; rule 2: generating motion candidates by scanning a list of regular motion candidates at most M times, where M is an integer less than 4; rule 3: performing a pruning step during the inserting wherein the pruning step is aligned with another pruning step performed for a regular motion candidate list for a second video block which is coded with non-geometry partitions; and rule 4: performing a partial pruning step during the inserting, wherein the partial pruning limits comparison with less than all available motion candidates for the partial pruning step.

In another example aspect, another method of video processing is disclosed. The method includes generating, during a conversion between a current video block and a bitstream representation of the current vide block, a merge list that includes at least one virtual merge candidate that is derived from other normal merge candidates in the merge list; and performing the conversion based on the merge list; wherein the at least one virtual merge candidate include one or more selected from a group consisting of: a) a virtual bi-prediction merge candidate that is derived from two normal uni-prediction merge candidates; b) a virtual uni-prediction merge candidate that is derived from one normal bi-prediction merge candidate.

In yet another example aspect, another method of video processing is disclosed. The method includes dividing a current video block into multiple sub-blocks video blocks; generating a merge candidate list for at least one sub-blocks video blocks of the multiple sub-blocks video blocks; and performing a conversion between the video block and a bitstream representation of the video block based one the merge candidate list; wherein the merge candidate list comprises at least one merge candidate with multi-hypothesis mode.

In another example aspect, the above-described method may be implemented by a video encoder apparatus or a video decoder apparatus that comprises a processor.

In yet another example aspect, these methods may be embodied in the form of processor-executable instructions and stored on a computer-readable program medium.

These, and other, aspects are further described in the present document.

BRIEF DESCRIPTION OF THE DRAWINGS

FIG. 15 shows examples of Above and Left blocks.

FIG. 23 shows an example of intra-picture block copy operation.

DETAILED DESCRIPTION

Figure 1:
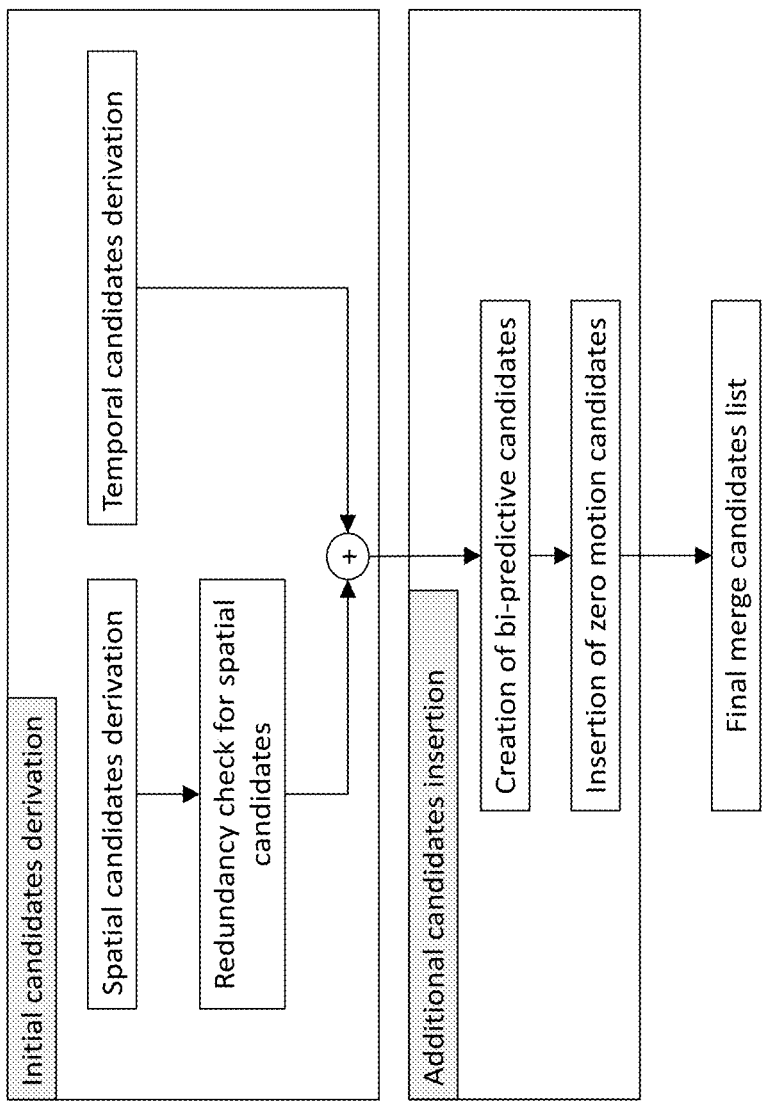
FIG. 1 is an example of derivation process for merge candidates list construction.

The present document provides various techniques that can be used by a decoder of video bitstreams to improve the quality of decompressed or decoded digital video. Furthermore, a video encoder may also implement these techniques during the process of encoding in order to reconstruct decoded frames used for further encoding.

Section headings are used in the present document for ease of understanding and do not limit the embodiments and techniques to the corresponding sections. As such, embodiments from one section can be combined with embodiments from other sections.

1. SUMMARY

This patent document is related to video coding technologies. Specifically, it is related to motion vector coding and signaling under geometry partitioning in video coding. It may be applied to the existing video coding standard like HEVC, or the standard (Versatile Video Coding) to be finalized. It may be also applicable to future video coding standards or video codec.

2. INTRODUCTORY COMMENTS

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the versatile video coding (VVC) standard targeting at 50% bitrate reduction compared to HEVC.

2.1 Inter Prediction in HEVC/H.265

Each inter-predicted PU has motion parameters for one or two reference picture lists. Motion parameters include a motion vector and a reference picture index. Usage of one of the two reference picture lists may also be signalled using inter_pred_idc. Motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighbouring PUs, including spatial and temporal candidates. The merge mode can be applied to any inter-predicted PU, not only for skip mode. The alternative to merge mode is the explicit transmission of motion parameters, where motion vector (to be more precise, motion vector difference compared to a motion vector predictor), corresponding reference picture index for each reference picture list and reference picture list usage are signalled explicitly per each PU. Such a mode is named Advanced motion vector prediction (AMVP) in this disclosure.

When signalling indicates that one of the two reference picture lists is to be used, the PU is produced from one block of samples. This is referred to as 'uni-prediction'. Uni-prediction is available both for P-slices and B-slices.

When signalling indicates that both of the reference picture lists are to be used, the PU is produced from two blocks of samples. This is referred to as 'bi-prediction'. Bi-prediction is available for B-slices only.

The following text provides the details on the inter prediction modes specified in HEVC. The description will start with the merge mode.

2.1.1 Reference Picture List

In HEVC, the term inter prediction is used to denote prediction derived from data elements (e.g., sample values or motion vectors) of reference pictures other than the current decoded picture. Like in H.264/AVC, a picture can be predicted from multiple reference pictures. The reference pictures that are used for inter prediction are organized in one or more reference picture lists. The reference index identifies which of the reference pictures in the list should be used for creating the prediction signal.

A single reference picture list, List 0, is used for a P slice and two reference picture lists, List 0 and List 1 are used for B slices. It should be noted reference pictures included in List 0/1 could be from past and future pictures in terms of capturing/display order.

2.1.2 Merge Mode 2.1.2.1 Derivation of Candidates for Merge Mode

When a PU is predicted using merge mode, an index pointing to an entry in the merge candidates list is parsed from the bitstream and used to retrieve the motion information. The construction of this list is specified in the HEVC standard and can be summarized according to the following sequence of steps:

Step 1: Initial candidates derivation
    Step 1.1: Spatial candidates derivation
    Step 1.2: Redundancy check for spatial candidates
    Step 1.3: Temporal candidates derivation
Step 2: Additional candidates insertion
    Step 2.1: Creation of bi-predictive candidates
    Step 2.2: Insertion of zero motion candidates These steps are also schematically depicted in FIG. 1. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates obtained from step 1 does not reach the maximum number of merge candidate (MaxNumMergeCand) which is signalled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

In the following, the operations associated with the aforementioned steps are detailed.

2.1.2.2 Spatial Candidates Derivation

Figure 2:
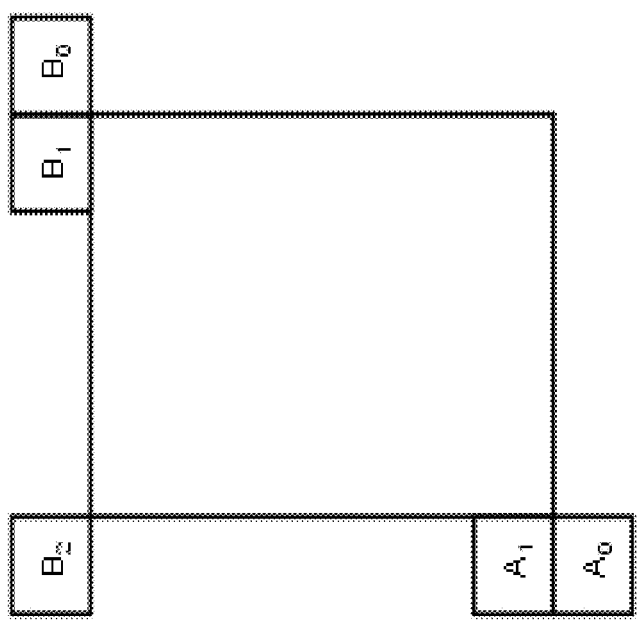
FIG. 2 shows example positions of spatial merge candidates.
Figure 3:
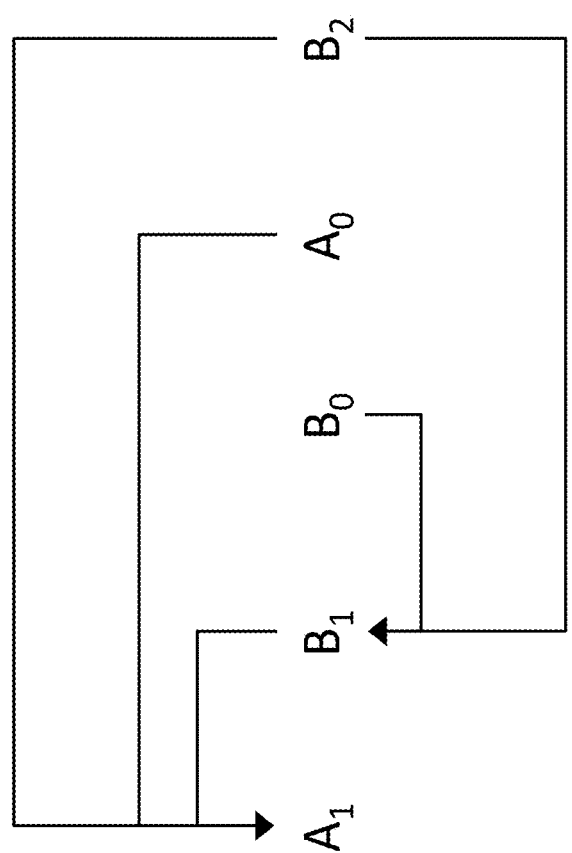
FIG. 3 shows an example of candidate pairs considered for redundancy check of spatial merge candidates.
Figures 4A, 4B:
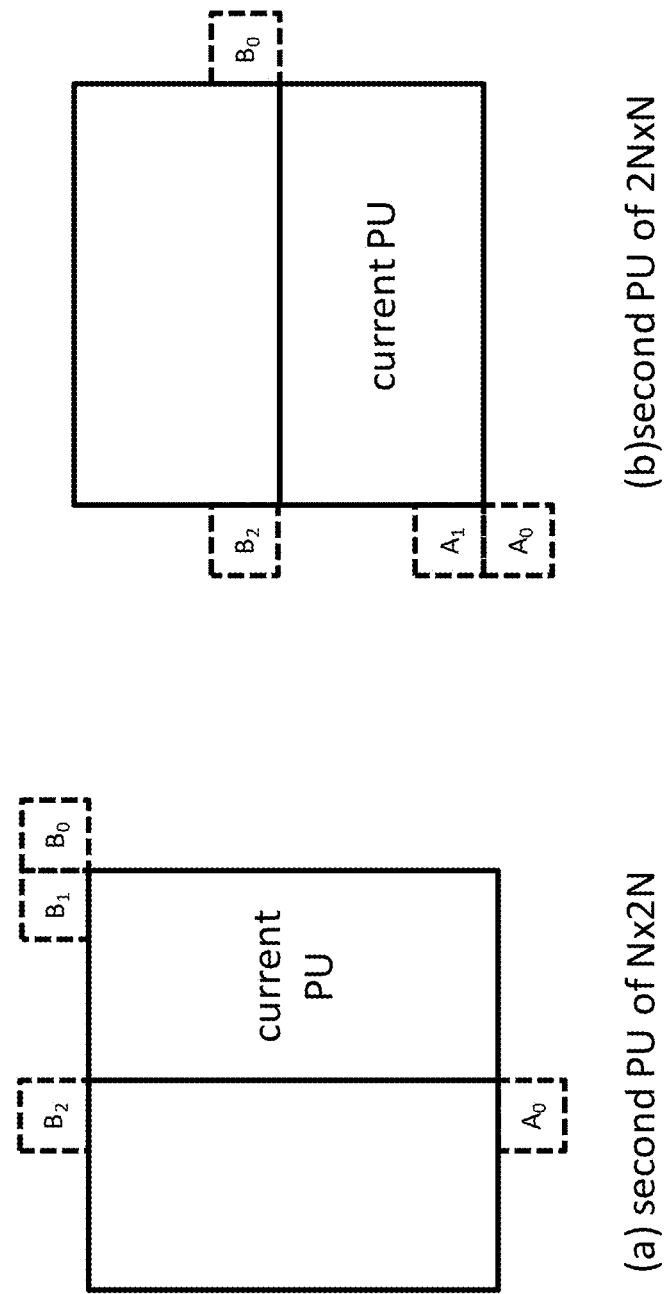
FIG. 4A-4B show example positions for the second PU of N×2N and 2N×N partitions.

In the derivation of spatial merge candidates, a maximum of four merge candidates are selected among candidates located in the positions depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "second PU" associated with partitions different from 2N×2N. As an example, FIG. 4A and FIG. 4B depict the second PU for the case of N×2N and 2N×N, respectively. When the current PU is partitioned as N×2N, candidate at position $A_1$ is not considered for list construction. In fact, by adding this candidate will lead to two prediction units having the same motion information, which is redundant to just have one PU in a coding unit. Similarly, position $B_1$ is not considered when the current PU is partitioned as 2N×N.

2.1.2.3 Temporal Candidates Derivation

Figure 5:
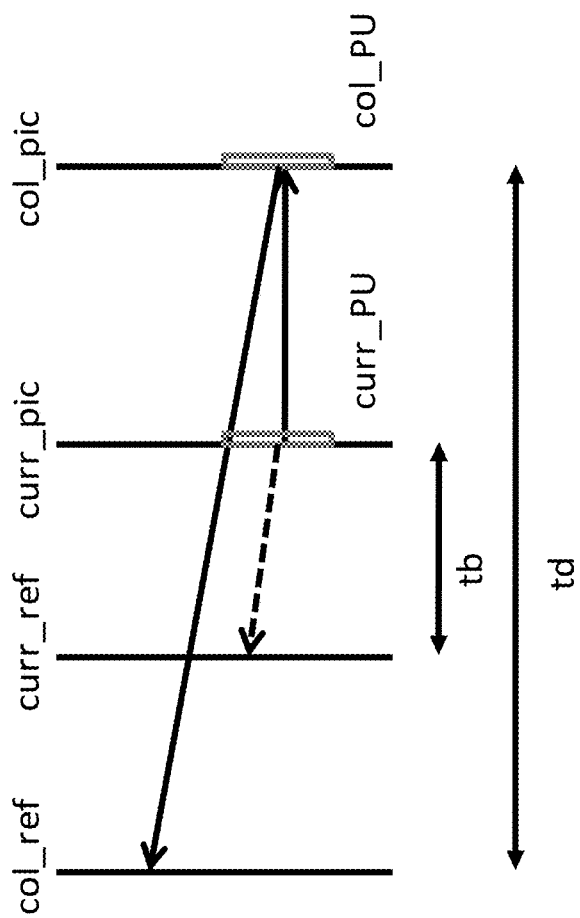
FIG. 5 is an example illustration of motion vector scaling for temporal merge candidate.

In this step, only one candidate is added to the list. Particularly, in the derivation of this temporal merge candidate, a scaled motion vector is derived based on co-located PU belonging to the picture which has the smallest POC difference with current picture within the given reference picture list. The reference picture list to be used for derivation of the co-located PU is explicitly signalled in the slice header. The scaled motion vector for temporal merge candidate is obtained as illustrated by the dotted line in FIG. 5, which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. A practical realization of the scaling process is described in the HEVC specification. For a B-slice, two motion vectors, one is for reference picture list 0 and the other is for reference picture list 1, are obtained and combined to make the bi-predictive merge candidate.

Figure 6:
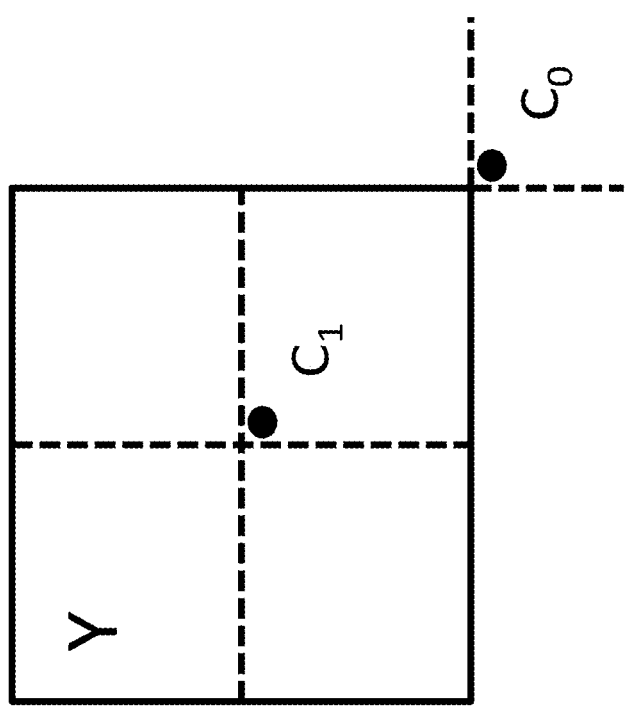
FIG. 6 shows example candidate positions for temporal merge candidate, C0 and C1.

In the co-located PU (Y) belonging to the reference frame, the position for the temporal candidate is selected between candidates $C_0$ and $C_1$, as depicted in FIG. 6. If PU at position $C_0$ is not available, is intra coded, or is outside of the current CTU row, position $C_1$ is used. Otherwise, position $C_0$ is used in the derivation of the temporal merge candidate.

2.1.2.4 Additional Candidates Insertion

Figure 7:
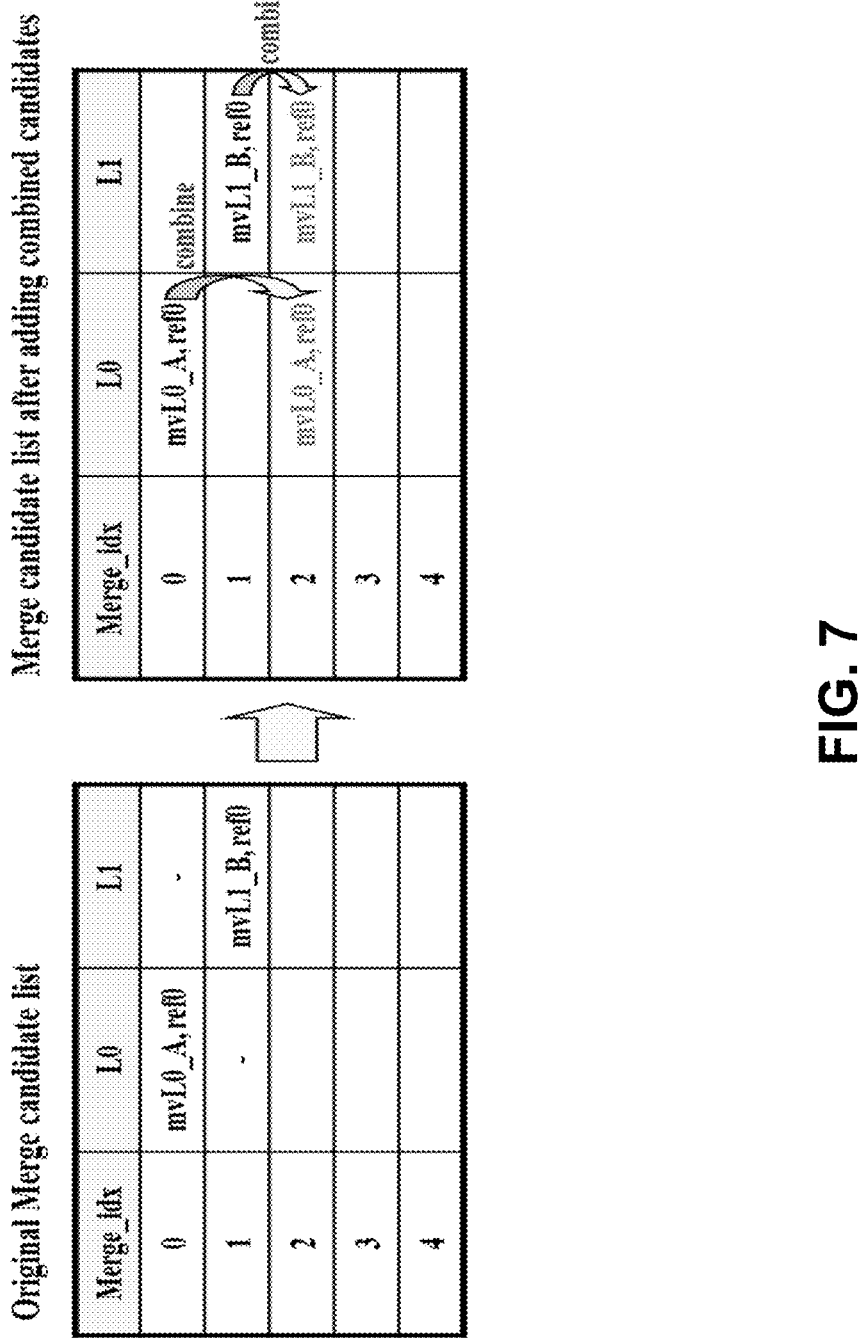
FIG. 7 shows an example of combined bi-predictive merge candidate.

Besides spatial and temporal merge candidates, there are two additional types of merge candidates: combined bi-predictive merge candidate and zero merge candidate. Combined bi-predictive merge candidates are generated by utilizing spatial and temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate. As an example, FIG. 7 depicts the case when two candidates in the original list (on the left), which have mvL0 and refIdxL0 or mvL1 and refIdxL1, are used to create a combined bi-predictive merge candidate added to the final list (on the right). There are numerous rules regarding the combinations which are considered to generate these additional merge candidates.

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. The number of reference frames used by these candidates is one and two for uni and bi-directional prediction, respectively. Finally, no redundancy check is performed on these candidates.

2.1.3 AMVP

AMVP exploits spatio-temporal correlation of motion vector with neighbouring PUs, which is used for explicit transmission of motion parameters. For each reference picture list, a motion vector candidate list is constructed by firstly checking availability of left, above temporally neighbouring PU positions, removing redundant candidates and adding zero vector to make the candidate list to be constant length. Then, the encoder can select the best predictor from the candidate list and transmit the corresponding index indicating the chosen candidate. Similarly with merge index signalling, the index of the best motion vector candidate is encoded using truncated unary. The maximum value to be encoded in this case is 2 (see FIG. 8). In the following sections, details about derivation process of motion vector prediction candidate are provided.

2.1.3.1 Derivation of AMVP Candidates

Figure 8:
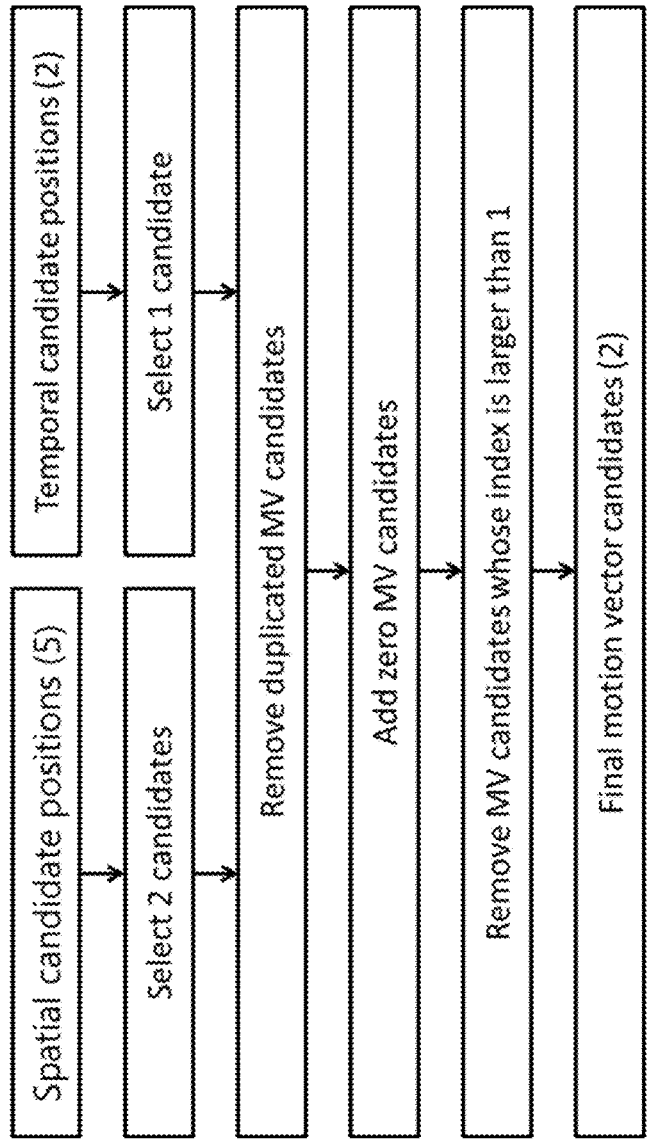
FIG. 8 shows an example derivation process for motion vector prediction candidates.

FIG. 8 summarizes derivation process for motion vector prediction candidate.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as depicted in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

2.1.3.2 Spatial Motion Vector Candidates

In the derivation of spatial motion vector candidates, a maximum of two candidates are considered among five potential candidates, which are derived from PUs located in positions as depicted in FIG. 2, those positions being the same as those of motion merge. The order of derivation for the left side of the current PU is defined as $A_0$, $A_1$, and scaled $A_0$, scaled $A_1$. The order of derivation for the above side of the current PU is defined as $B_0$, $B_1$, $B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows.

No spatial scaling
(1) Same reference picture list, and same reference picture index (same POC)
(2) Different reference picture list, but same reference picture (same POC)

Spatial scaling
(3) Same reference picture list, but different reference picture (different POC)
(4) Different reference picture list, and different reference picture (different POC)

The no-spatial-scaling cases are checked first followed by the spatial scaling. Spatial scaling is considered when the POC is different between the reference picture of the neighbouring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
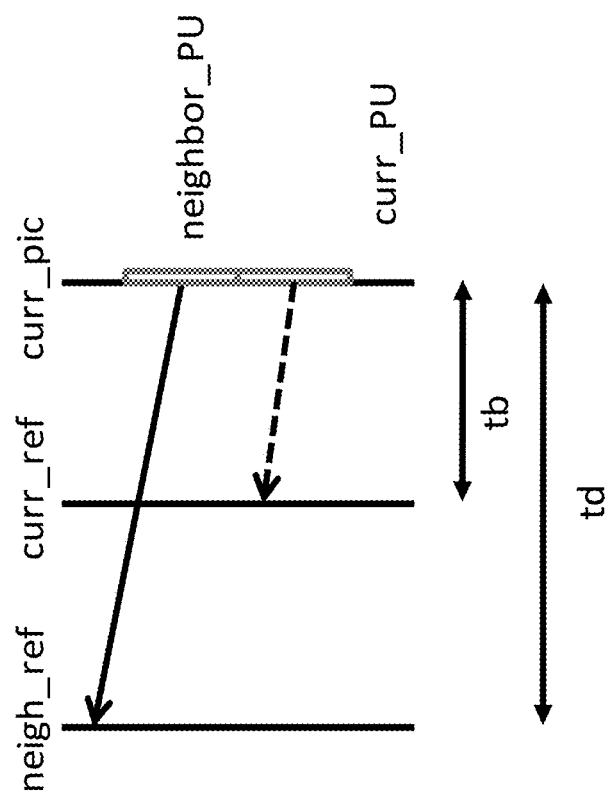
FIG. 9 is an example illustration of motion vector scaling for spatial motion vector candidate.

In a spatial scaling process, the motion vector of the neighbouring PU is scaled in a similar manner as for temporal scaling, as depicted as FIG. 9. The main difference is that the reference picture list and index of current PU is given as input; the actual scaling process is the same as that of temporal scaling.

2.1.3.3 Temporal Motion Vector Candidates

Apart for the reference picture index derivation, all processes for the derivation of temporal merge candidates are the same as for the derivation of spatial motion vector candidates (see FIG. 6). The reference picture index is signalled to the decoder.

2.2 Sub-CU Based Motion Vector Prediction

In the JEM with QTBT, each CU can have at most one set of motion parameters for each prediction direction. Two sub-CU level motion vector prediction methods are considered in the encoder by splitting a large CU into sub-CUs and deriving motion information for all the sub-CUs of the large CU. Alternative temporal motion vector prediction (ATMVP) method allows each CU to fetch multiple sets of motion information from multiple blocks smaller than the current CU in the collocated reference picture. In spatial-temporal motion vector prediction (STMVP) method motion vectors of the sub-CUs are derived recursively by using the temporal motion vector predictor and spatial neighbouring motion vector.

To preserve more accurate motion field for sub-CU motion prediction, the motion compression for the reference frames is currently disabled.

2.2.1 Alternative Temporal Motion Vector Prediction

Figure 10:
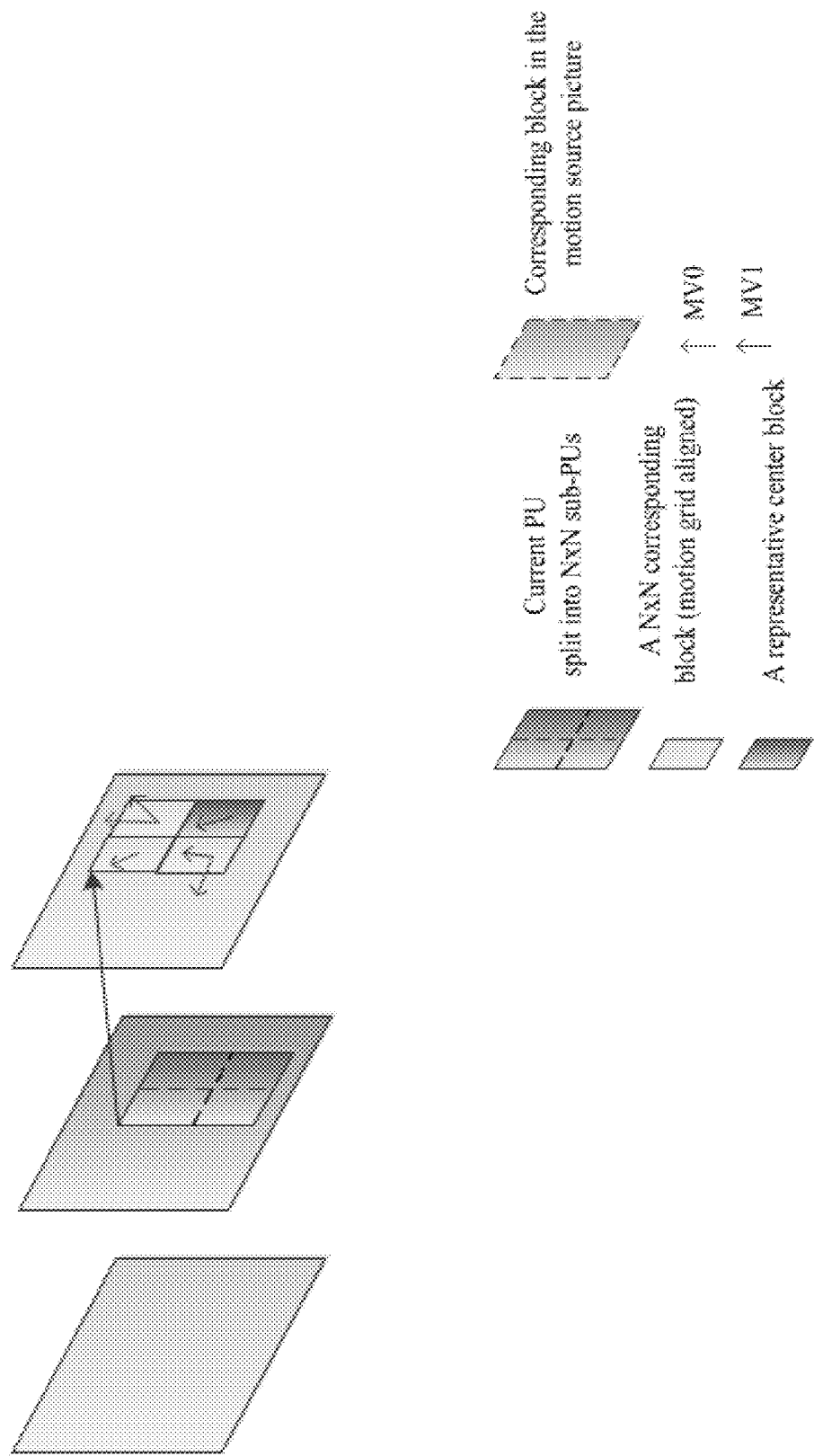
FIG. 10 shows an example of alternative temporal motion vector prediction (ATMVP) motion prediction for a CU.

With reference to FIG. 10, in the alternative temporal motion vector prediction (ATMVP) method, the motion vectors temporal motion vector prediction (TMVP) is modified by fetching multiple sets of motion information (including motion vectors and reference indices) from blocks smaller than the current CU. The sub-CUs are square N×N blocks (N is set to 4 by default).

ATMVP predicts the motion vectors of the sub-CUs within a CU in two steps. The first step is to identify the corresponding block in a reference picture with a so-called temporal vector. The reference picture is called the motion source picture. The second step is to split the current CU into sub-CUs and obtain the motion vectors as well as the reference indices of each sub-CU from the block corresponding to each sub-CU.

In the first step, a reference picture and the corresponding block is determined by the motion information of the spatial neighbouring blocks of the current CU. To avoid the repetitive scanning process of neighbouring blocks, the first merge candidate in the merge candidate list of the current CU is used. The first available motion vector as well as its associated reference index are set to be the temporal vector and the index to the motion source picture. This way, in ATMVP, the corresponding block may be more accurately identified, compared with TMVP, wherein the corresponding block (sometimes called collocated block) is always in a bottom-right or center position relative to the current CU.

In the second step, a corresponding block of the sub-CU is identified by the temporal vector in the motion source picture, by adding to the coordinate of the current CU the temporal vector. For each sub-CU, the motion information of its corresponding block (the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply. For example, the decoder checks whether the low-delay condition (i.e. the POCs of all reference pictures of the current picture are smaller than the POC of the current picture) is fulfilled and possibly uses motion vector $MV_x$ (the motion vector corresponding to reference picture list X) to predict motion vector $MV_y$ (with X being equal to 0 or 1 and Y being equal to 1-X) for each sub-CU.

2.2.2 Spatial-Temporal Motion Vector Prediction (STMVP)

Figure 11:
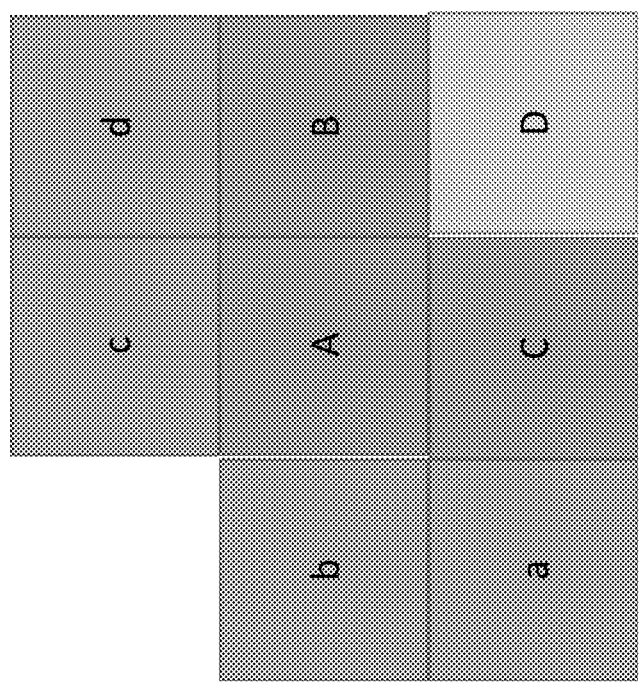
FIG. 11 shows an example of one CU with four sub-blocks (A-D) and its neighbouring blocks (a-d).

In this method, the motion vectors of the sub-CUs are derived recursively, following raster scan order. FIG. 11 illustrates this concept. Let us consider an 8×8 CU which contains four 4×4 sub-CUs A, B, C, and D. The neighbouring 4×4 blocks in the current frame are labelled as a, b, c, and d.

The motion derivation for sub-CU A starts by identifying its two spatial neighbours. The first neighbour is the N×N block above sub-CU A (block c). If this block c is not available or is intra coded the other N×N blocks above sub-CU A are checked (from left to right, starting at block c). The second neighbour is a block to the left of the sub-CU A (block b). If block b is not available or is intra coded other blocks to the left of sub-CU A are checked (from top to bottom, staring at block b). The motion information obtained from the neighbouring blocks for each list is scaled to the first reference frame for a given list. Next, temporal motion vector predictor (TMVP) of sub-block A is derived by following the same procedure of TMVP derivation as specified in HEVC. The motion information of the collocated block at location D is fetched and scaled accordingly. Finally, after retrieving and scaling the motion information, all available motion vectors (up to 3) are averaged separately for each reference list. The averaged motion vector is assigned as the motion vector of the current sub-CU.

2.2.3 Sub-CU Motion Prediction Mode Signalling

The sub-CU modes are enabled as additional merge candidates and there is no additional syntax element required to signal the modes. Two additional merge candidates are added to merge candidates list of each CU to represent the ATMVP mode and STMVP mode. Up to seven merge candidates are used, if the sequence parameter set indicates that ATMVP and STMVP are enabled. The encoding logic of the additional merge candidates is the same as for the merge candidates in the HM, which means, for each CU in P or B slice, two more RD checks is needed for the two additional merge candidates.

In the JEM, all bins of merge index are context coded by CABAC. While in HEVC, only the first bin is context coded and the remaining bins are context by-pass coded.

2.3 Inter Prediction Methods in VVC

There are several new coding tools for inter prediction improvement, such as Adaptive motion vector difference resolution (AMVR) for signaling MVD, affine prediction mode, Triangular prediction mode (TPM), ATMVP, Generalized Bi-Prediction (GBI), Bi-directional Optical flow (BIO).

2.3.1 Adaptive Motion Vector Difference Resolution

In HEVC, motion vector differences (MVDs) (between the motion vector and predicted motion vector of a PU) are signalled in units of quarter luma samples when use_integer_mv_flag is equal to 0 in the slice header. In the JEM, a locally adaptive motion vector resolution (LAMVR) is introduced. In the JEM, MVD can be coded in units of quarter luma samples, integer luma samples or four luma samples. The MVD resolution is controlled at the coding unit (CU) level, and MVD resolution flags are conditionally signalled for each CU that has at least one non-zero MVD components.

For a CU that has at least one non-zero MVD components, a first flag is signalled to indicate whether quarter luma sample MV precision is used in the CU. When the first flag (equal to 1) indicates that quarter luma sample MV precision is not used, another flag is signalled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

In the encoder, CU-level RD checks are used to determine which MVD resolution is to be used for a CU. That is, the CU-level RD check is performed three times for each MVD resolution. To accelerate encoder speed, the following encoding schemes are applied in the JEM.

During RD check of a CU with normal quarter luma sample MVD resolution, the motion information of the current CU (integer luma sample accuracy) is stored. The stored motion information (after rounding) is used as the starting point for further small range motion vector refinement during the RD check for the same CU with integer luma sample and 4 luma sample MVD resolution so that the time-consuming motion estimation process is not duplicated three times.

RD check of a CU with 4 luma sample MVD resolution is conditionally invoked. For a CU, when RD cost integer luma sample MVD resolution is much larger than that of quarter luma sample MVD resolution, the RD check of 4 luma sample MVD resolution for the CU is skipped.

Figure 12:
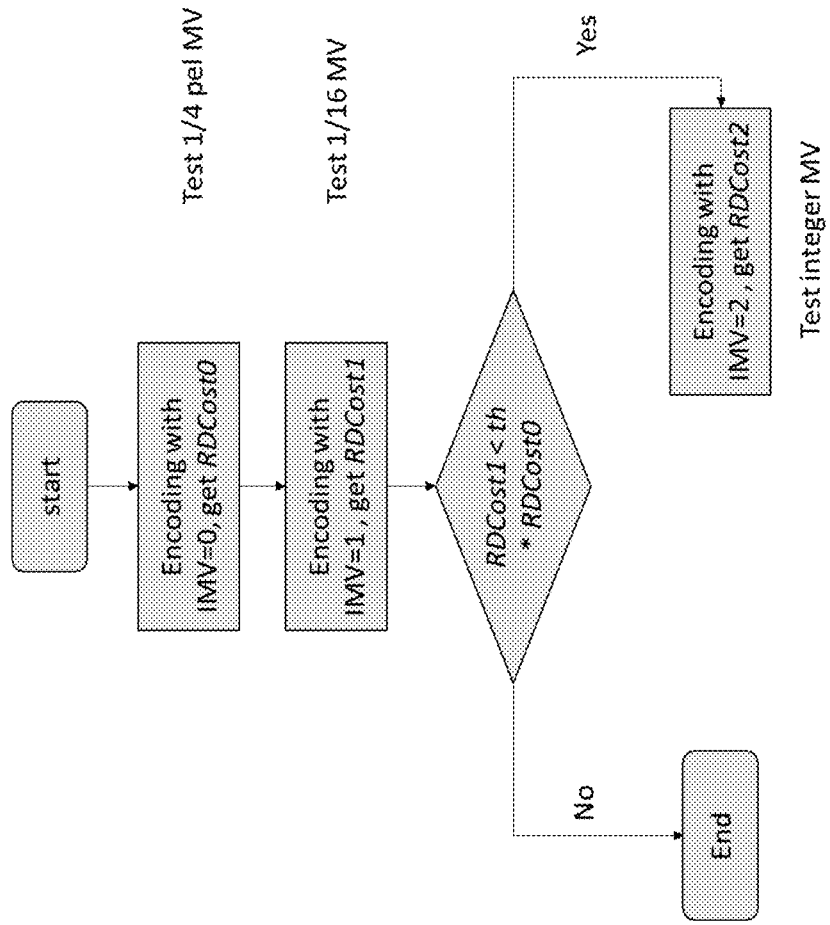
FIG. 12 is a flowchart of an example of encoding with different MV precision

The encoding process is shown in FIG. 12. First, ¼ pel MV is tested and the RD cost is calculated and denoted as RDCost0, then integer MV is tested and the RD cost is denoted as RDCost1. If RDCost1<th*RDCost0 (wherein th is a positive value), then 4-pel MV is tested; otherwise, 4-pel MV is skipped. Basically, motion information and RD cost etc. are already known for ¼ pel MV when checking integer or 4-pel MV, which can be reused to speed up the encoding process of integer or 4-pel MV.

2.3.2 Triangular Prediction Mode

Figure 13B:
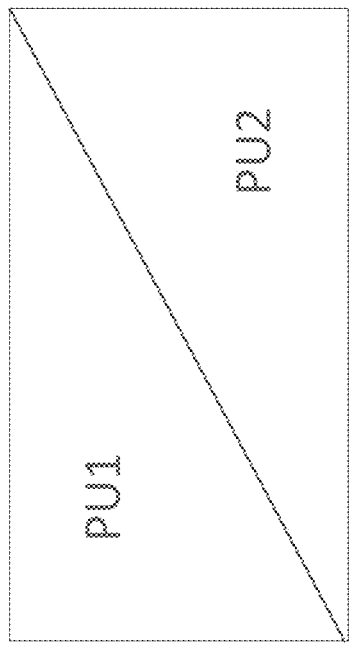
FIG. 13A-13B show 135 degree partition type (splitting from top-left corner to bottom-right corner), and 45 degree splitting patterns. An illustration of splitting a CU into two triangular prediction units (two splitting patterns).
Figure 13A:
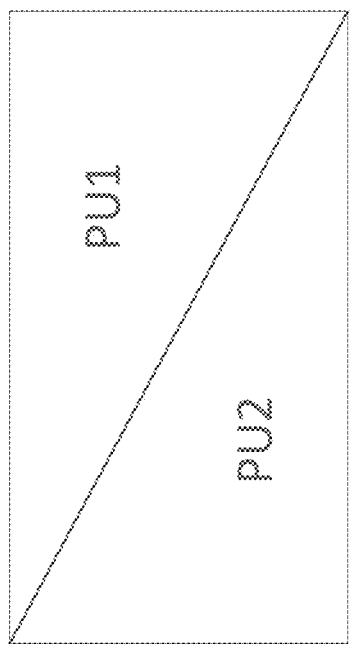

The concept of the triangular prediction mode (TPM) is to introduce a new triangular partition for motion compensated prediction. As shown in FIGS. 13A and 13B, it splits a CU into two triangular prediction units, in either diagonal or inverse diagonal direction. Each triangular prediction unit in the CU is inter-predicted using its own uni-prediction motion vector and reference frame index which are derived from one single uni-prediction candidate list. An adaptive weighting process is performed to the diagonal edge after predicting the triangular prediction units. Then, the transform and quantization process are applied to the whole CU. It is noted that this mode is only applied to merge modes (including skip mode, wherein skip mode is treated as a special merge mode).

2.3.2.1 Uni-Prediction Candidate List for TPM

Figure 14:
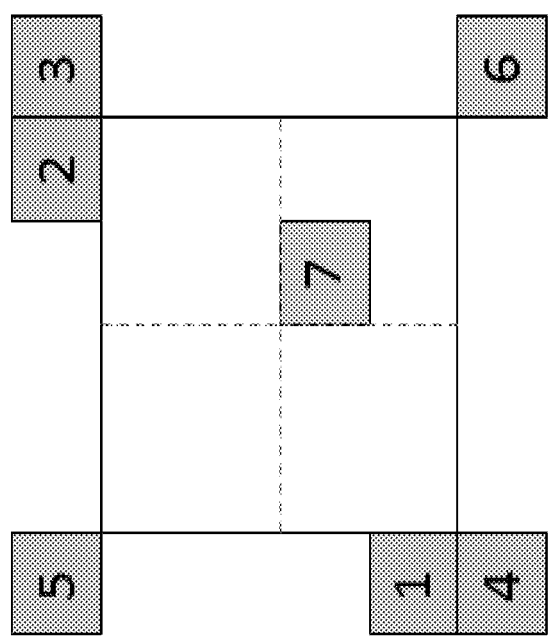
FIG. 14 shows an example of position of the neighboring blocks.

The uni-prediction candidate list, named TPM motion candidate list, consists of five uni-prediction motion vector candidates. It is derived from seven neighboring blocks of the CU including five spatial neighboring blocks (1 to 5) and two temporal co-located blocks (6 to 7), as shown in FIG. 14. The motion vectors of the seven neighboring blocks are collected and put into the uni-prediction candidate list according in the order of uni-prediction motion vectors, L0 motion vector of bi-prediction motion vectors, L1 motion vector of bi-prediction motion vectors, and averaged motion vector of the L0 and L1 motion vectors of bi-prediction motion vectors. If the number of candidates is less than five, zero motion vector is added to the list. Motion candidates added in this list for TPM are called TPM candidates, motion information derived from spatial/temporal blocks are called regular motion candidates.

More specifically, the following steps are involved:
1) Obtain regular motion candidates from $A_1$, $B_1$, $B_0$, $A_0$, $B_2$, Col and Col2 (corresponding to block 1-7 in FIG. 14) without any pruning operations.
2) Set variable numCurrMergeCand=0
3) For each regular motion candidates derived from $A_1$, $B_1$, $B_0$, $A_0$, $B_2$, Col and Col2 and numCurrMergeCand is less than 5, if the regular motion candidate is uni-prediction (either from List 0 or List 1), it is directly added to the merge list as an TPM candidate with numCurrMergeCand increased by 1. Such a TPM candidate is named 'originally uni-predicted candidate'.
Full pruning is applied.
4) For each motion candidates derived from $A_1$, $B_1$, $B_0$, $A_0$, $B_2$, Col and Col2 and numCurrMergeCand is less than 5, if the regular motion candidate is bi-prediction, the motion information from List 0 is added to the TPM merge list (that is, modified to be uni-prediction from List 0) as a new TPM candidate and numCurrMergeCand increased by 1. Such a TPM candidate is named 'Truncated List0-predicted candidate'.
Full pruning is applied.
5) For each motion candidates derived from $A_1$, $B_1$, $B_0$, $A_0$, $B_2$, Col and Col2 and numCurrMergeCand is less than 5, if the regular motion candidate is bi-prediction, the motion information from List 1 is added to the TPM merge list (that is, modified to be uni-prediction from List 1) and numCurrMergeCand increased by 1. Such a TPM candidate is named 'Truncated List1-predicted candidate'.
Full pruning is applied.
6) For each motion candidates derived from $A_1$, $B_1$, $B_0$, $A_0$, $B_2$, Col and Col2 and numCurrMergeCand is less than 5, if the regular motion candidate is bi-prediction, If List 0 reference picture's slice QP is smaller than List 1 reference picture's slice QP, the motion information of List 1 is firstly scaled to List 0 reference picture, and the average of the two MVs (one is from original List 0, and the other is the scaled MV from List 1) is added to the TPM merge list, such a candidate is called averaged uni-prediction from List 0 motion candidate and numCurrMergeCand increased by 1.

Otherwise, the motion information of List 0 is firstly scaled to List 1 reference picture, and the average of the two MVs (one is from original List 1, and the other is the scaled MV from List 0) is added to the TPM merge list, such a TPM candidate is called averaged uni-prediction from List 1 motion candidate and numCurrMergeCand increased by 1.

Full pruning is applied.

7) If numCurrMergeCand is less than 5, zero motion vector candidates are added.

When inserting a candidate to the list, if it has to be compared to all previously added candidates to see whether it is identical to one of them, such a process is called full pruning.

2.3.2.2 Adaptive Weighting Process

After predicting each triangular prediction unit, an adaptive weighting process is applied to the diagonal edge between the two triangular prediction units to derive the final prediction for the whole CU. Two weighting factor groups are defined as follows:

$1^{st}$ weighting factor group: $\{7/8, 6/8, 4/8, 2/8, 1/8\}$ and $\{7/8, 4/8, 1/8\}$ are used for the luminance and the chrominance samples, respectively;

$2^{nd}$ weighting factor group: $\{7/8, 6/8, 5/8, 4/8, 3/8, 2/8, 1/8\}$ and $\{6/8, 4/8, 2/8\}$ are used for the luminance and the chrominance samples, respectively.

Weighting factor group is selected based on the comparison of the motion vectors of two triangular prediction units. The $2^{nd}$ weighting factor group is used when the reference pictures of the two triangular prediction units are different from each other or their motion vector difference is larger than 16 pixels. Otherwise, the $1^{st}$ weighting factor group is used. Examples are is shown in FIG. 15A-15B.

2.3.2.3 Signaling of Triangular Prediction Mode (TPM)

One bit flag to indicate whether TPM is used may be firstly signaled. Afterwards, the indications of two splitting patterns (as depicted in FIG. 13A-13B), and selected merge indices for each of the two partitions are further signaled.

2.3.2.3.1 Signaling of TPM Flag

Let's denote one luma block's width and height by W and H, respectively. If W*H<64, triangular prediction mode is disabled.

When one block is coded with affine mode, triangular prediction mode is also disabled.

When one block is coded with merge mode, one bit flag may be signaled to indicate whether the triangular prediction mode is enabled or disabled for the block.

The flag is coded with 3 contexts, based on the following equation (see FIG. 15)

Ctx index=((left block $L$ available && $L$ is coded with TPM?)1:0)+((Above block $A$ available && $A$ is coded with TPM?)1:0);

2.3.2.3.2 Signaling of an Indication of Two Splitting Patterns (as Depicted in FIGS. 13A-13B), and Selected Merge Indices for Each of the Two Partitions It is noted that splitting patterns, merge indices of two partitions are jointly coded. It is restricted that the two partitions couldn't use the same reference index. Therefore, there are 2 (splitting patterns)*N (maximum number of merge candidates)*(N−1) possibilities wherein N is set to 5. One indication is coded and the mapping between the splitting patterns, two merge indices and coded indication are derived from the array defined below:

const uint8_t g_TriangleCombination[TRIANGLE_MAX_NUM_CANDS][3]={{0, 1, 0}, {1, 0, 1}, {1, 0, 2}, {0, 0, 1}, {0, 2, 0}, {1, 0, 3}, {1, 0, 4}, {1, 1, 0}, {0, 3, 0}, {0, 4, 0}, {0, 0, 2}, {0, 1, 2}, {1, 1, 2}, {0, 0, 4}, {0, 0, 3}, {0, 1, 3}, {0, 1, 4}, {1, 1, 4}, {1, 1, 3}, {1, 2, 1}, {1, 2, 0}, {0, 2, 1}, {0, 4, 3}, {1, 3, 0}, {1, 3, 2}, {1, 3, 4}, {1, 4, 0}, {1, 3, 1}, {1, 2, 3}, {1, 4, 1}, {0, 4, 1}, {0, 2, 3}, {1, 4, 2}, {0, 3, 2}, {1, 4, 3}, {0, 3, 1}, {0, 2, 4}, {1, 2, 4}, {0, 4, 2}, {0, 3, 4}};

splitting patterns (45 degree or 135 degree)=g_TriangleCombination[signaled indication][0];

Merge index of candidate A=g_TriangleCombination[signaled indication][1];

Merge index of candidate B=g_TriangleCombination[signaled indication][2];

Once the two motion candidates A and B are derived, the two partitions' (PU1 and PU2) motion information could be set either from A or B. Whether PU1 uses the motion information of merge candidate A or B is dependent on the prediction directions of the two motion candidates. Table 1 shows the relationship between two derived motion candidates A and B, with the two partitions.

TABLE 1

Derivation of partitions' motion information from derived two merge candidates (A, B)

| Prediction direction of A | Prediction direction of B | PU1's motion information | PU2's motion information |
|---|---|---|---|
| L0 | L0 | A (L0) | B (L0) |
| L1 | L1 | B (L1) | A (L1) |
| L0 | L1 | A (L0) | B (L1) |
| L1 | L0 | B (L0) | A (L1) |

2.3.2.3.3 Entropy Coding of the Indication (Denoted by Merge_Triangle_Idx)

merge_triangle_idx is within the range [0, 39], inclusively. K-th order Exponential Golomb (EG) code is used for binarization of merge_triangle_idx wherein K is set to 1.

K-th Order EG

To encode larger numbers in fewer bits (at the expense of using more bits to encode smaller numbers), this can be generalized using a nonnegative integer parameter k. To encode a nonnegative integer x in an order-k exp-Golomb code:

1. Encode $\lfloor x/2^k \rfloor$ using order-0 exp-Golomb code described above, then
2. Encode x mod $2^k$ in binary

TABLE 2

Exp-Golomb-k coding examples

| x | k = 0 | k = 1 | k = 2 |
|---|---|---|---|
| 0 | 1 | 10 | 100 |
| 1 | 010 | 11 | 101 |
| 2 | 011 | 0100 | 110 |
| 3 | 00100 | 0101 | 111 |
| 4 | 00101 | 0110 | 01000 |
| 5 | 00110 | 0111 | 01001 |

TABLE 2-continued

Exp-Golomb-k coding examples

| x | k = 0 | k = 1 | k = 2 |
|---|---|---|---|
| 6 | 00111 | 001000 | 01010 |
| 7 | 0001000 | 001001 | 01011 |
| 8 | 0001001 | 001010 | 01100 |
| 9 | 0001010 | 001011 | 01101 |
| 10 | 0001011 | 001100 | 01110 |
| 11 | 0001100 | 001101 | 01111 |
| 12 | 0001101 | 001110 | 0010000 |
| 13 | 0001110 | 001111 | 0010001 |
| 14 | 0001111 | 00010000 | 0010010 |
| 15 | 000010000 | 00010001 | 0010011 |
| 16 | 000010001 | 00010010 | 0010100 |
| 17 | 000010010 | 00010011 | 0010101 |
| 18 | 000010011 | 00010100 | 0010110 |
| 19 | 000010100 | 00010101 | 0010111 |

2.3.3 Affine Motion Compensation Prediction

Figure 16A:
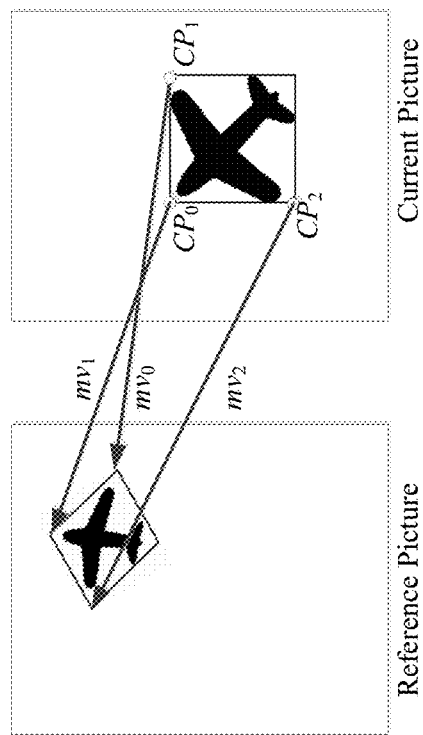
FIG. 16A-16B show examples of 2 control point motion vectors (CPMVs) and 3 CPMVs.
Figure 16B:
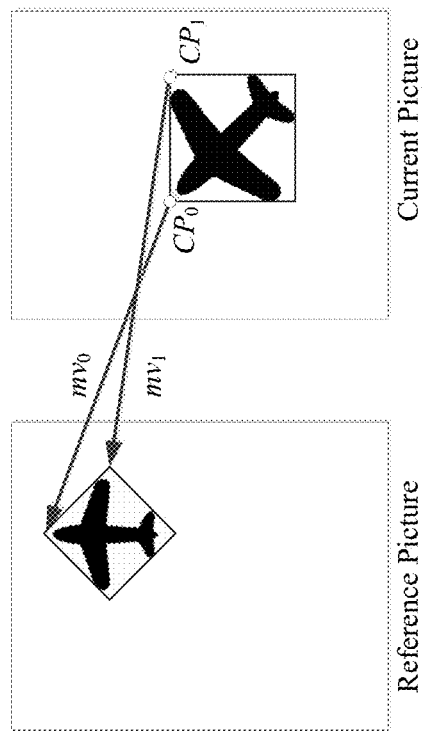

In HEVC, only translation motion model is applied for motion compensation prediction (MCP). While in the real world, there are many kinds of motion, e.g. zoom in/out, rotation, perspective motions and the other irregular motions. In the JEM, a simplified affine transform motion compensation prediction is applied. As shown in FIGS. 16A-16B, the affine motion field of the block is described by two control point motion vectors.

The motion vector field (MVF) of a block is described by the following equation:

$$\begin{cases} v_x = \frac{(v_{1x} - v_{0x})}{w} x - \frac{(v_{1y} - v_{0y})}{w} y + v_{0x} \\ v_y = \frac{(v_{1y} - v_{0y})}{w} x + \frac{(v_{1x} + v_{0x})}{w} y + v_{0y} \end{cases} \quad (1\text{-a})$$

For 6-parameter affine, $$\begin{cases} v_x = \frac{(v_{1x} - v_{0x})}{w} x + \frac{(v_{2x} - v_{0x})}{h} y + v_{0x} \\ v_y = \frac{(v_{1y} - v_{0y})}{w} x + \frac{(v_{2y} - v_{0y})}{h} y + v_{0y} \end{cases} \quad (1\text{-b})$$

Where $(v_{0x}, v_{0y})$ is motion vector of the top-left corner control point, and $(v_{1x}, v_{1y})$ is motion vector of the top-right corner control point and $(v_{2x}, v_{2y})$ is motion vector of the bottom-left corner control point, (x, y) represents the coordinate of a representative point relative to the top-left sample within current block. In VTM, the representative point is defined to be the center position of a sub-block, e.g., when the coordinate of the left-top corner of a sub-block relative to the top-left sample within current block is (xs, ys), the coordinate of the representative point is defined to be (xs+2, ys+2).

In order to further simplify the motion compensation prediction, sub-block based affine transform prediction is applied. The sub-block size M×N is derived as in Equation 2, where MvPre is the motion vector fraction accuracy (1/16 in JEM), $(v_{2x}, v_{2y})$ is motion vector of the bottom-left control point, calculated according to Equation 1.

$$\begin{cases} M = \text{clip3}\left(4, w, \frac{w \times MvPre}{\max(\text{abs}(v_{1x} - v_{0x}), \text{abs}(v_{1y} - v_{0y}))}\right) \\ N = \text{clip3}\left(4, h, \frac{h \times MvPre}{\max(\text{abs}(v_{2x} - v_{0x}), \text{abs}(v_{2y} - v_{0y}))}\right) \end{cases} \quad (2)$$

After derived by Equation 2, M and N should be adjusted downward if necessary to make it a divisor of w and h, respectively.

Figure 17:
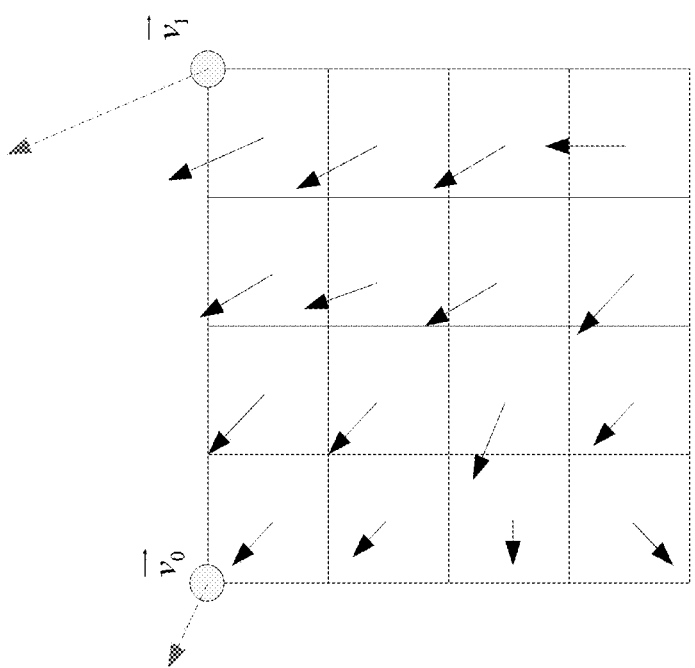
FIG. 17 shows an example of two CPMVs.

To derive motion vector of each M×N sub-block, the motion vector of the center sample of each sub-block, as shown in FIG. 17, is calculated according to Equation 1, and rounded to 1/16 fraction accuracy. Then the motion compensation interpolation filters mentioned in section 2.2.3 are applied to generate the prediction of each sub-block with derived motion vector.

Figure 21B:
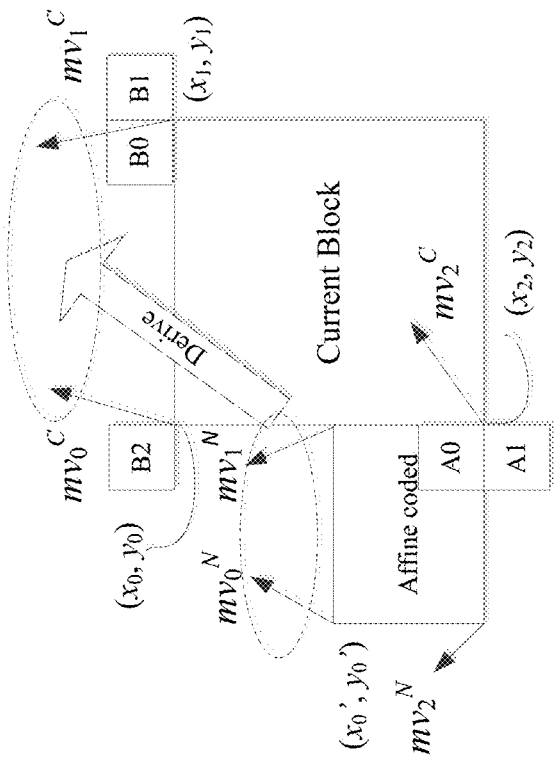
FIG. 21A-21B show examples of control point motion vectors in affine coding in AF_MERGE.
Figure 21A:
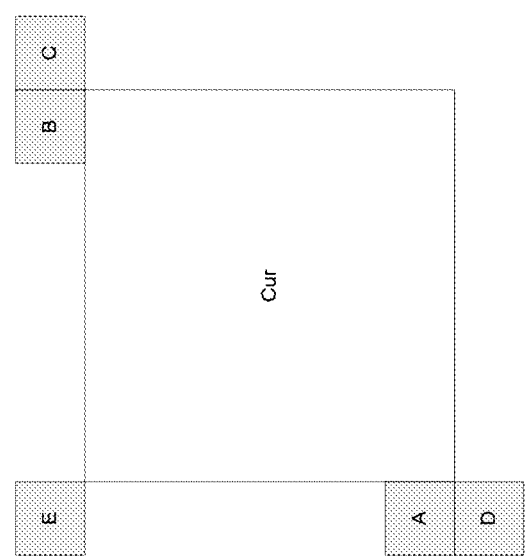

FIG. 21A-21B shows an example of affine motion vector field MVF per sub-block.

After MCP, the high accuracy motion vector of each sub-block is rounded and saved as the same accuracy as the normal motion vector.

2.3.3.1 Signaling of Affine Prediction

Similar to the translational motion model, there are also two modes for signaling the side information due affine prediction. They are AFFINE_INTER and AFFINE_MERGE modes.

2.3.3.2 AF_INTER Mode

For CUs with both width and height larger than 8, AF_INTER mode can be applied. An affine flag in CU level is signalled in the bitstream to indicate whether AF_INTER mode is used.

In this mode, for each reference picture list (List 0 or List 1), an affine AMVP candidate list is constructed with three types of affine motion predictors in the following order, wherein each candidate includes the estimated CPMVs of the current block. The differences of the best CPMVs found at the encoder side (such as $mv_0$ $mv_1$ $mv_2$ in FIG. 20) and the estimated CPMVs are signalled. In addition, the index of affine AMVP candidate from which the estimated CPMVs are derived is further signalled.

1) Inherited Affine Motion Predictors

Figure 19:
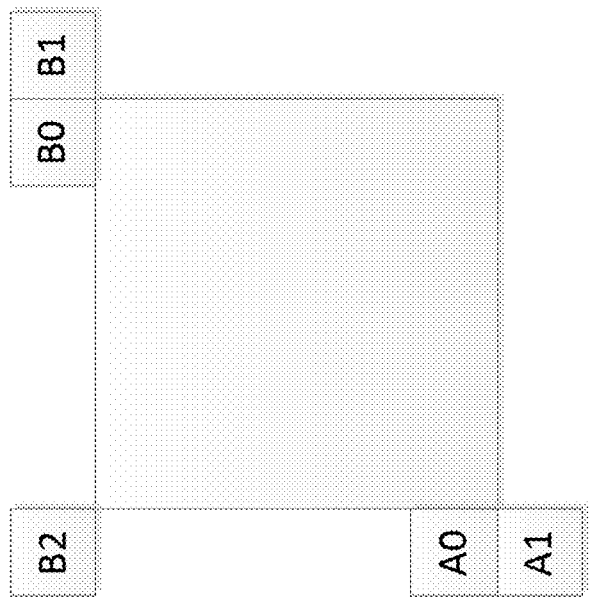
FIG. 19 MVP for AF_INTER for inherited affine candidates.

The checking order is similar to that of spatial MVPs in HEVC AMVP list construction. First, a left inherited affine motion predictor is derived from the first block in {A1, A0} that is affine coded and has the same reference picture as in current block. Second, an above inherited affine motion predictor is derived from the first block in {B1, B0, B2} that is affine coded and has the same reference picture as in current block. The five blocks A1, A0, B1, B0, B2 are depicted in FIG. 19.

Once a neighboring block is found to be coded with affine mode, the CPMVs of the coding unit covering the neighboring block are used to derive predictors of CPMVs of current block. For example, if A1 is coded with non-affine mode and A0 is coded with 4-parameter affine mode, the left inherited affine MV predictor will be derived from A0. In this case, the CPMVs of a CU covering A0, as denoted by $MV_0^N$ for the top-left CPMV and $MV_1^N$ for the top-right CPMV in FIG. 21B are utilized to derive the estimated CPMVs of current block, denoted by $MV_0^C$, $MV_1^C$, $MV_2^C$ for the top-left (with coordinate (x0, y0)), top-right (with coordinate (x1, y1)) and bottom-right positions (with coordinate (x2, y2)) of current block.

2) Constructed Affine Motion Predictors

Figure 20:
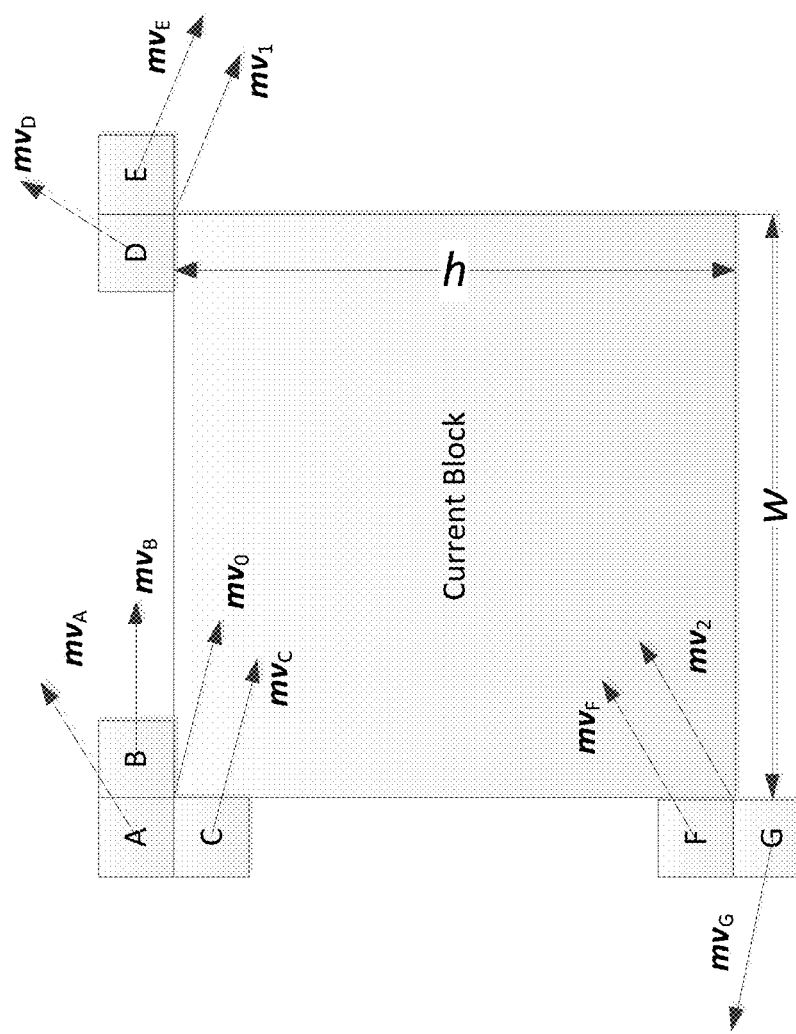
FIG. 20 shows an example of constructing affine motion predictors in AF_INTER.

A constructed affine motion predictor consists of control-point motion vectors (CPMVs) that are derived from neighboring inter coded blocks, as shown in FIG. 20, that have the same reference picture. If the current affine motion model is 4-parameter affine, the number of CPMVs is 2, otherwise if the current affine motion model is 6-parameter affine, the number of CPMVs is 3. The top-left CPMV $\overline{mv}_0$ is derived by the MV at the first block in the group {A, B, C} that is inter coded and has the same reference picture as in current block. The top-right CPMV $\overline{mv}_1$ is derived by the MV at the first block in the group {D, E} that is inter coded and has the same reference picture as in current block. The bottom-left CPMV $\overline{mv}_2$ is derived by the MV at the first block in the group {F, G} that is inter coded and has the same reference picture as in current block.

If the current affine motion model is 4-parameter affine, then a constructed affine motion predictor is inserted into the candidate list only if both $\overline{mv}_0$ and $\overline{mv}_1$ are founded, that is, $\overline{mv}_0$ and $\overline{mv}_1$ are used as the estimated CPMVs for top-left (with coordinate (x0, y0)), top-right (with coordinate (x1, y1)) positions of current block.

If the current affine motion model is 6-parameter affine, then a constructed affine motion predictor is inserted into the candidate list only if $\overline{mv}_0$, $\overline{mv}_1$ and $\overline{mv}_2$ are all founded, that is, $\overline{mv}_0$, $\overline{mv}_1$ and $\overline{mv}_2$ are used as the estimated CPMVs for top-left (with coordinate (x0, y0)), top-right (with coordinate (x1, y1)) and bottom-right (with coordinate (x2, y2)) positions of current block.

No pruning process is applied when inserting a constructed affine motion predictor into the candidate list.

3) Normal AMVP Motion Predictors

The following applies until the number of affine motion predictors reaches the maximum.

1) Derive an affine motion predictor by setting all CPMVs equal to $\overline{mv}_2$ if available.
2) Derive an affine motion predictor by setting all CPMVs equal to $\overline{mv}_1$ if available.
3) Derive an affine motion predictor by setting all CPMVs equal to $\overline{mv}_0$ if available.
4) Derive an affine motion predictor by setting all CPMVs equal to HEVC TMVP if available.
5) Derive an affine motion predictor by setting all CPMVs to zero MV.

Note that $\overline{mv}_1$ is already derived in constructed affine motion predictor.

Figure 18B:
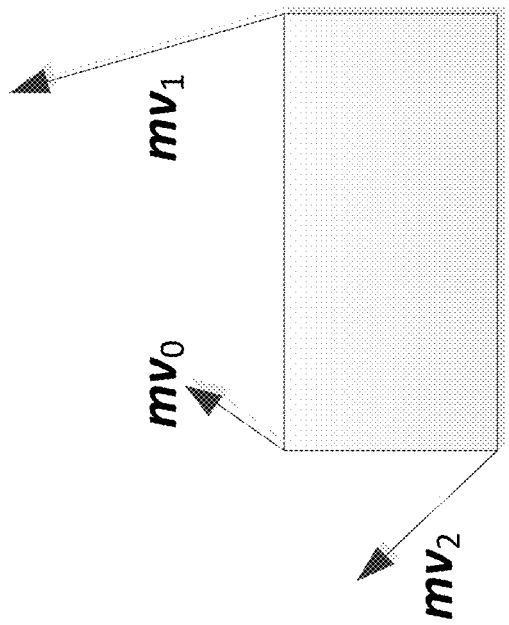
FIG. 18A-18B show examples of 4 and 6 parameter affine models.
Figure 18A:
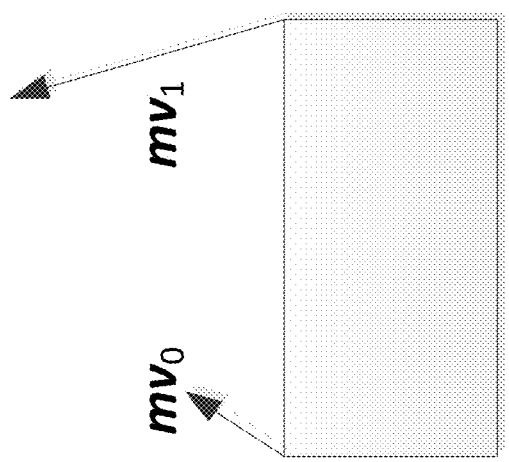

In AF_INTER mode, when 4/6-parameter affine mode is used, ⅔ control points are required, and therefore ⅔ MVD needs to be coded for these control points, as shown in FIG. 18A-18B. It is proposed to derive the MV as follows, i.e., $mvd_1$ and $mvd_2$ are predicted from $mvd_0$.

$mv_0 = \overline{mv}_0 + mvd_0$ $mv_1 = \overline{mv}_1 + mvd_1 + mvd_0$ $mv_2 = \overline{mv}_2 + mvd_2 + mvd_0$ Wherein $\overline{mv}_i$, $mvd_i$ and $mv_1$ are the predicted motion vector, motion vector difference and motion vector of the top-left pixel (i=0), top-right pixel (i=1) or left-bottom pixel (i=2) respectively, as shown in FIG. 18B. Please note that the addition of two motion vectors (e.g., mvA(xA, yA) and mvB(xB, yB)) is equal to summation of two components separately, that is, newMV=mvA+mvB and the two components of newMV is set to (xA+xB) and (yA+yB), respectively.

2.3.3.3 AF_MERGE Mode

When a CU is applied in AF_MERGE mode, it gets the first block coded with affine mode from the valid neighbour reconstructed blocks. And the selection order for the candidate block is from left, above, above right, left bottom to above left as shown in FIG. 21A (denoted by A, B, C, D, E in order). For example, if the neighbour left bottom block is coded in affine mode as denoted by A0 in FIG. 21B, the Control Point (CP) motion vectors $mv_0^N$, $mv_1^N$ and $mv_2^N$ of the top left corner, above right corner and left bottom corner of the neighbouring CU/PU which contains the block A are fetched. And the motion vector $mv_0^C$, $mv_1^C$ and $mv_2^C$ (which is only used for the 6-parameter affine model) of the top left corner/top right/bottom left on the current CU/PU is calculated based on $mv_0^N$, $mv_1^N$ and $mv_2^N$. It should be noted that in VTM-2.0, sub-block (e.g. 4×4 block in VTM) located at the top-left corner stores mv0, the sub-block located at the top-right corner stores mv1 if the current block is affine coded. If the current block is coded with the 6-parameter affine model, the sub-block located at the bottom-left corner stores mv2; otherwise (with the 4-parameter affine model), LB stores mv2'. Other sub-blocks stores the MVs used for MC.

After the CPMV of the current CU $mv_0^C$, $mv_1^C$ and $mv_2^C$ are derived, according to the simplified affine motion model Equation (1) and (2), the MVF of the current CU is generated. In order to identify whether the current CU is coded with AF_MERGE mode, an affine flag is signalled in the bitstream when there is at least one neighbour block is coded in affine mode.

An affine merge candidate list is constructed with following steps:

1) Insert Inherited Affine Candidates

Inherited affine candidate means that the candidate is derived from the affine motion model of its valid neighbor affine coded block. The maximum two inherited affine candidates are derived from affine motion model of the neighboring blocks and inserted into the candidate list. For the left predictor, the scan order is {A0, A1}; for the above predictor, the scan order is {B0, B1, B2}.

2) Insert Constructed Affine Candidates

If the number of candidates in affine merge candidate list is less than MaxNumAffineCand (set to 5), constructed affine candidates are inserted into the candidate list. Constructed affine candidate means the candidate is constructed by combining the neighbor motion information of each control point.

Figure 22:
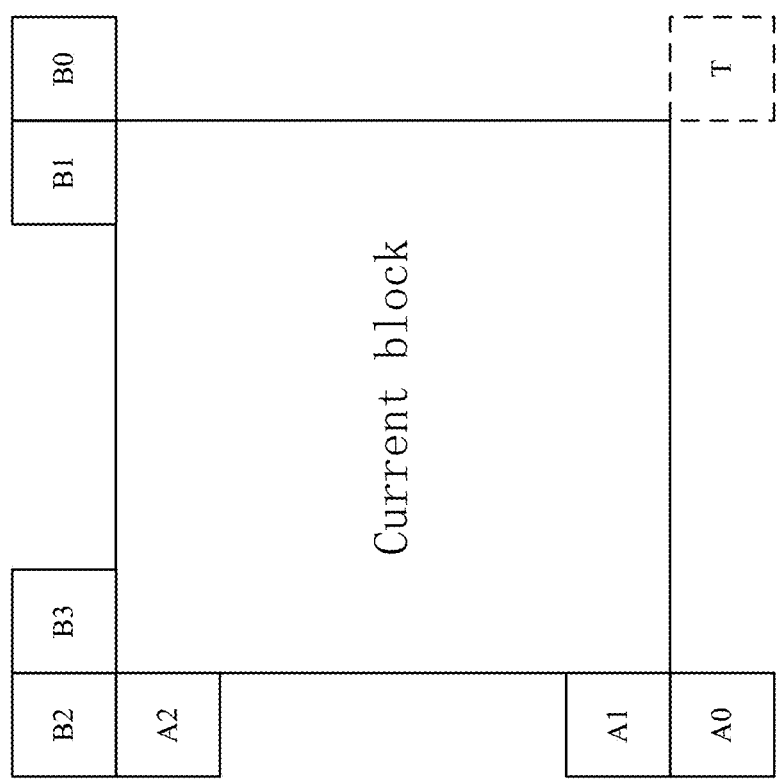
FIG. 22 shows examples of candidate positions for affine merge mode.

The motion information for the control points is derived firstly from the specified spatial neighbors and temporal neighbor shown in FIG. 22. CPk (k=1, 2, 3, 4) represents the k-th control point. A0, A1, A2, B0, B1, B2 and B3 are spatial positions for predicting CPk (k=1, 2, 3); T is temporal position for predicting CP4.

The coordinates of CP1, CP2, CP3 and CP4 is (0, 0), (W, 0), (H, 0) and (W, H), respectively, where W and H are the width and height of current block.

FIG. 22 shows candidates position for affine merge mode.

The motion information of each control point is obtained according to the following priority order:

For CP1, the checking priority is B2→B3→A2. B2 is used if it is available. Otherwise, if B2 is available, B3 is used. If both B2 and B3 are unavailable, A2 is used. If all the three candidates are unavailable, the motion information of CP1 cannot be obtained.

For CP2, the checking priority is B1→B0.

For CP3, the checking priority is A1→A0.

For CP4, T is used.

Secondly, the combinations of controls points are used to construct an affine merge candidate.

Motion information of three control points are needed to construct a 6-parameter affine candidate. The three control points can be selected from one of the following four combinations ({CP1, CP2, CP4}, {CP1, CP2, CP3}, {CP2, CP3, CP4}, {CP1, CP3, CP4}). Combinations {CP1, CP2, CP3}, {CP2, CP3, CP4}, {CP1, CP3, CP4} will be converted to a 6-parameter motion model represented by top-left, top-right and bottom-left control points.

Motion information of two control points are needed to construct a 4-parameter affine candidate. The two control points can be selected from one of the two combinations ({CP1, CP2}, {CP1, CP3}). The two combinations will be converted to a 4-parameter motion model represented by top-left and top-right control points.

The combinations of constructed affine candidates are inserted into to candidate list as following order:
{CP1, CP2, CP3}, {CP1, CP2, CP4}, {CP1, CP3, CP4}, {CP2, CP3, CP4}, {CP1, CP2}, {CP1, CP3}

The available combination of motion information of CPs is only added to the affine merge list when the CPs have the same reference index.

Padding with Zero Motion Vectors

If the number of candidates in affine merge candidate list is less than 5, zero motion vectors with zero reference indices are insert into the candidate list, until the list is full.

2.3.4 Current Picture Referencing

Intra block copy (IBC, or intra picture block compensation), also named current picture referencing (CPR) was adopted in HEVC screen content coding extensions (SCC). This tool is very efficient for coding of screen content video in that repeated patterns in text and graphics rich content occur frequently within the same picture. Having a previously reconstructed block with equal or similar pattern as a predictor can effectively reduce the prediction error and therefore improve coding efficiency. An example of the intra block compensation is illustrated in FIG. 23, which shows an example of intra-picture block copy.

Similar to the design of CRP in HEVC SCC, In VVC, the use of the IBC mode is signaled at both sequence and picture level. When the IBC mode is enabled at sequence parameter set (SPS), it can be enabled at picture level. When the IBC mode is enabled at picture level, the current reconstructed picture is treated as a reference picture. Therefore, no syntax change on block level is needed on top of the existing VVC inter mode to signal the use of the IBC mode.

Main features:

It is treated as a normal inter mode. Therefore, merge and skip modes are also available for the IBC mode. The merge candidate list construction is unified, containing merge candidates from the neighboring positions that are either coded in the IBC mode or the HEVC inter mode. Depending on the selected merge index, the current block under merge or skip mode can merge into either an IBC mode coded neighbor or otherwise a normal inter mode coded one with different pictures as reference pictures.

Block vector prediction and coding schemes for the IBC mode reuse the schemes used for motion vector prediction and coding in the HEVC inter mode (AMVP and MVD coding).

The motion vector for the IBC mode, also referred as block vector, is coded with integer-pel precision, but stored in memory in 1/16-pel precision after decoding as quarter-pel precision is required in interpolation and deblocking stages. When used in motion vector prediction for the IBC mode, the stored vector predictor will be right shifted by 4.

Search range: it is restricted to be within the current CTU.

CPR is disallowed when affine mode/triangular mode/GBI/weighted prediction is enabled.

2.3.5 Merge List Design in VVC

There are three different merge list construction processes supported in VVC:

1) Sub-block merge candidate list: it includes ATMVP and affine merge candidates. One merge list construction process is shared for both affine modes and ATMVP mode. Here, the ATMVP and affine merge candidates may be added in order. Sub-block merge list size is signaled in slice header, and maximum value is 5.

2) Uni-Prediction TPM merge list: For triangular prediction mode, one merge list construction process for the two partitions is shared even two partitions could select their own merge candidate index. When constructing this merge list, the spatial neighbouring blocks and two temporal blocks of the block are checked. The motion information derived from spatial neighbours and temporal blocks are called regular motion candidates in our IDF. These regular motion candidates are further utilized to derive multiple TPM candidates. Please note the transform is performed in the whole block level, even two partitions may use different motion vectors for generating their own prediction blocks. Uni-Prediction TPM merge list size is fixed to be 5.

3) Regular merge list: For remaining coding blocks, one merge list construction process is shared. Here, the spatial/temporal/HMVP, pairwise combined bi-prediction merge candidates and zero motion candidates may be inserted in order. Regular merge list size is signaled in slice header, and maximum value is 6.

2.3.5.1 Sub-Block Merge Candidate List

It is suggested that all the sub-block related motion candidates are put in a separate merge list in addition to the regular merge list for non-sub block merge candidates.

The sub-block related motion candidates are put in a separate merge list is named as 'sub-block merge candidate list'.

In one example, the sub-block merge candidate list includes affine merge candidates, and ATMVP candidate, and/or sub-block based STMVP candidate.

In some embodiments, the ATMVP merge candidate in the normal merge list is moved to the first position of the affine merge list. Such that all the merge candidates in the new list (i.e., sub-block based merge candidate list) are based on sub-block coding tools.

2.3.5.2 Regular Merge List

Different from the merge list design, in VVC, the history-based motion vector prediction (HMVP) method is employed.

In HMVP, the previously coded motion information is stored. The motion information of a previously coded block is defined as an HMVP candidate. Multiple HMVP candidates are stored in a table, named as the HMVP table, and this table is maintained during the encoding/decoding process on-the-fly. The HMVP table is emptied when starting coding/decoding a new slice. Whenever there is an inter-coded block, the associated motion information is added to the last entry of the table as a new HMVP candidate. The overall coding flow is depicted in FIG. 23.

Figure 24:
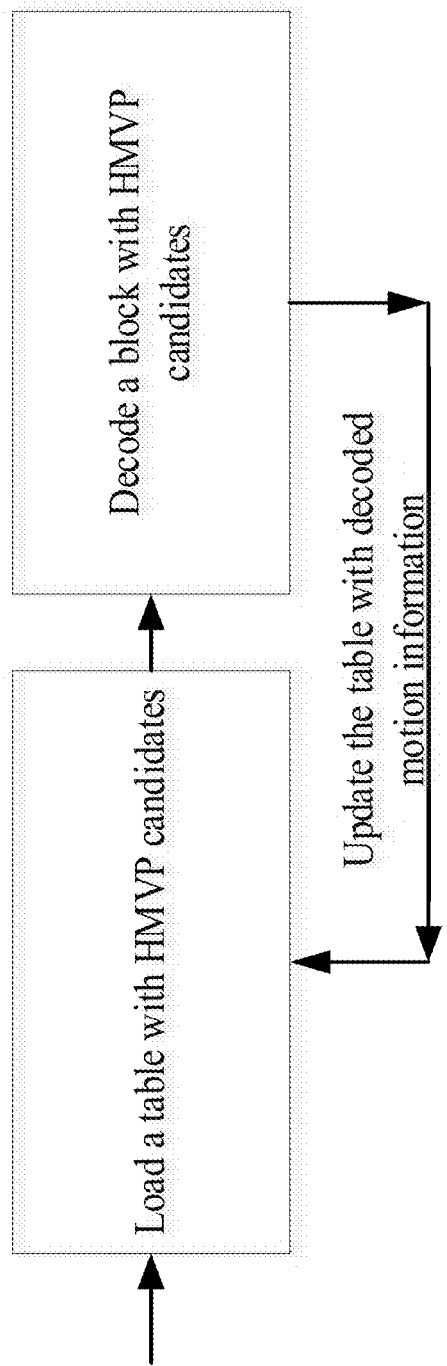
FIG. 24 shows candidates position for affine merge mode

HMVP candidates could be used in both AMVP and merge candidate list construction processes. FIG. 24 depicts the modified merge candidate list construction process (highlighted in the table). When the merge candidate list is not full after the TMVP candidate insertion, HMVP candidates stored in the HMVP table could be utilized to fill in the merge candidate list. Considering that one block usually has a higher correlation with the nearest neighbouring block in terms of motion information, the HMVP candidates in the table are inserted in a descending order of indices. The last entry in the table is firstly added to the list, while the first entry is added in the end. Similarly, redundancy removal is applied on the HMVP candidates. Once the total number of available merge candidates reaches the maximal number of merge candidates allowed to be signaled, the merge candidate list construction process is terminated.

Figure 25:
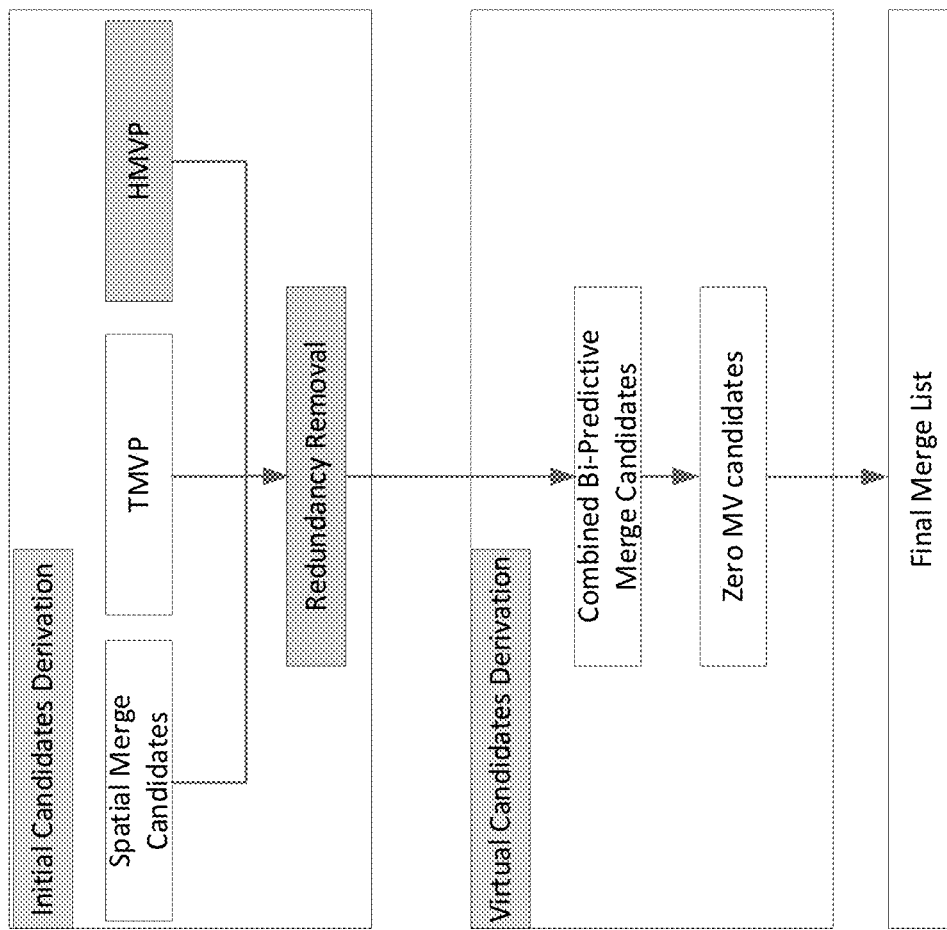
FIG. 25 shows modified merge list construction process.

FIG. 24 shows candidates position for affine merge mode.
FIG. 25 shows modified merge list construction process.

3. EXAMPLES OF PROBLEMS OVERCOME BY EMBODIMENTS

1) In the current design of VVC, three different merge list are utilized with different procedures which increases the hardware implementation cost.
2) For all of the three merge lists, they need to access both spatial blocks and temporal blocks, i.e., loading motion information from spatial blocks and temporal blocks. However, loading motion information from temporal blocks typically requires much longer time which increase the critical path.
3) Uni-Prediction TPM merge list requires to traverse the available regular motion candidates multiple times, to identify originally uni-predicted candidates, Truncated List0-predicted candidates, Truncated List1-predicted candidates, averaged uni-prediction from List 0 motion candidates, and averaged uni-prediction from List 1 motion candidates.
4) For affine merge candidates derivation process, the affine model (4-parameter or 6-paramater) type is directly inherited from neighboring blocks which requires additional line buffer size to store the affine model type.

4. EXAMPLE EMBODIMENTS

The proposed methods could be applied to any of non-square/non-rectangular partitions, e.g., geometry partitions. In the following descriptions, we use 'triangular partition mode' to represent one as an example of the non-square/non-rectangular partition mode (TPM), and the motion vector prediction candidate inserted to TPM candidate list is named 'TPM candidates'. These partitions are also called geometry partitions, and other partitions that are rectangular or square may thus be referred to as "non-geometry" partitions. And the motion information associated with any previously coded blocks is named as 'regular motion candidate'. It should be noted other kinds of partitions may be also applicable.

A regular motion candidate is defined as a motion candidate with its motion information derived from a previously coded block (e.g., adjacent or non-adjacent spatial/temporal block). HMVP candidates could also be treated as a regular motion candidate.

The detailed list of techniques below should be considered as examples to explain general concepts. These techniques should not be interpreted in a narrow way. Furthermore, these techniques can be combined in any manner.

Uni-Prediction TPM Merge List
1. It is proposed to remove the scaling process in the averaged uni-prediction from List 0/1 motion candidate derivation process from a regular bi-prediction motion candidate.
   a. In one example, the average of two motion vectors is directly used as the motion vector of a TPM candidate without any scaling operation.
   b. Alternatively, furthermore, the condition check of reference picture's slice QP is also removed.
2. It is proposed to remove multiple scans of regular motion candidates (4 times in current design). Instead, the candidates are only scanned M times (M is smaller than 4) and utilized to derive the TPM candidate list.
   a. In one example, M is set to 1 or 2.
   b. In one example, the regular motion candidates derived from spatial and/or temporal blocks are inserted to the TPM candidate list in a given order.
      i. In one example, the checking order of regular motion candidates derived from spatial blocks (i.e., spatial merge candidates) is different from that used for the regular merge list construction process. For example, B1, A1, A0, B0, B2. Alternatively, the same order for inserting spatial merge candidates is utilized, e.g., A1, B1, B0, A0, B2.
      ii. In one example, the checking order of regular motion candidates derived from spatial blocks (i.e., spatial merge candidates) and temporal blocks is different from that used for the regular merge list construction process. For example, B1, A1, C1, C0, A0, B0, B2.
      iii. In one example, the checking order of regular motion candidates derived from spatial and/or temporal blocks and/or HMVP candidates is the same as the regular merge list construction process is applied.
   c. In one example, when a regular motion candidate is found, if it is uni-prediction, it is directly added to the TPM candidate list.
   d. In one example, when a regular motion candidate is found, if it is bi-prediction, it is not added to the TPM candidate list.
      i. Alternatively, it is used to derive one uni-prediction TPM candidate and the derived TPM candidate may be added to the TPM candidate list. In one example, the Truncated List0 or List1-predicted candidate may be derived and added. Alternatively, furthermore, whether to derive a TPM candidate with prediction from List 0 or List 1 may depend on previously added TPM candidates.
      ii. Alternatively, it is used to derive multiple uni-prediction TPM candidates and all of them may be added to the TPM candidate list. In one example, the Truncated List0-predicted candidate and Truncated List1-predicted candidate and may be derived and added. Alternatively, furthermore, the order of adding multiple TPM candidates derived from one bi-prediction regular motion candidate may depend on previously added TPM candidates, or may be fixed.
      iii. Alternatively, it may be used to derive one or more TPM candidates with the following way: using the average or weighted average of the two motion vectors for the two reference picture lists, and use either List 0 or List 1 as the prediction direction for the derived TPM candidate.
   e. When M is set to 2, the first scan is to identify all the uni-prediction regular candidates, use them to derive TPM candidates (e.g., directly copy). For the second scan, all the bi-prediction regular candidates are utilized to derive TPM candidates.
      i. Alternatively, the first scan is to identify all the bi-prediction regular candidates, use them to derive TPM candidates (e.g., truncated List0 or List1-predicted candidates). For the second scan, all the uni-prediction regular candidates are utilized to derive TPM candidates (e.g., directly copy).
   f. In addition to those TPM candidates derived from regular motion candidates associated with spatial/temporal blocks, other kinds of TPM candidates may be also added to the TPM candidate list.

i. A new candidate derived from available TPM candidates (e.g., by averaging two MVs of two TPM candidates, by adding some offset to the MV of a TPM candidate, by scaling a MV of a TPM candidate to a different reference picture) may be added.
3. It is proposed to align the pruning process in the TPM merge list derivation process and that used in the regular merge list.
   a. In one example, when applying pruning process for both lists, the MVs and reference picture indices of two candidates are compared (i.e., same as that used in the regular merge list).
   b. In one example, when applying pruning process for both lists, the MVs and reference pictures' POC values of two candidates are compared (i.e., same as that used in the TPM merge list).
4. Instead of using full pruning when inserting a new TPM candidate to the TPM candidate list, it may be compared to partial of available TPM candidates.
   a. The selection of which available TPM candidates should be compared to a new TPM candidate to be added, may be depend on the position wherein the TPM candidate is derived from, i.e., from where the regular motion candidate (used for generating this TPM candidate) is associated with.
   b. The selection of which available TPM candidates should be compared to a new TPM candidate to be added, may be depend on the indices of the TPM candidates.
   c. The selection of which available TPM candidates should be compared to a new TPM candidate to be added, may be depend on the TPM candidate type.
      i. For example, if two TPM candidates are both Truncated List0/1-predicted candidates, they are not compared.
      ii. For example, if two TPM candidates are both originally uni-predicted candidates, they are compared.
   d. Alternatively, the pruning between regular merge candidates may be firstly invoked. While when adding a TPM candidate derived from the regular merge candidate, no additional pruning is applied.

Multiple Hypothesis for Sub-Block Prediction Blocks
5. Multiple hypothesis may be also applied to sub-block coded blocks (e.g., affine or ATMVP).
   a. One bit flag may be signaled even it is indicated that the sub-block merge candidate list is utilized.
   b. In one example, for the sub-block merge candidate list, two uni-prediction merge candidates may be jointly utilized for coding a block.
   c. In one example, the two uni-prediction merge candidate could be defined as one is ATMVP and the other is affine merge candidate.
   d. Alternatively, the two uni-prediction merge candidate could be defined as two affine merge candidate.
   e. In one example, the first two uni-prediction merge candidate is selected when this mode is enabled. Therefore, there is no need to signal the selected merge indices.
   f. Alternatively, selected merge indices may be further signaled.
   g. Such a mode may be enabled for certain block dimensions and disabled for other kinds of dimensions.
   h. Whether the mode flag is signaled or not depends on the width (w) and height (h) of the current block.
      i. The flag is not signaled if w>Tw and h>Th. e.g. Tw=Th=32;
      ii. The flag is not signaled if w>Tw or h>Th. e.g. Tw=Th=32;
      iii. The flag is not signaled if w*h>Ts. e.g. Ts=1024;
      iv. The flag is not signaled if w<Tw and h<Th. e.g. Tw=Th=16;
      v. The flag is not signaled if w<Tw or h<Th. e.g. Tw=Th=16;
      vi. The flag is not signaled if w*h<Ts. e.g. Ts=256;

Affine Prediction
6. It is proposed that a virtual bi-prediction affine merge candidate may be derived from two normal uni-prediction affine merge candidates and added to the affine merge candidate list/sub-block merge candidate list.
   a. In one example, the virtual bi-prediction affine merge candidate may be defined as directly coping the motion information of the two normal uni-prediction affine merge candidates.
   b. The two normal uni-prediction affine merge candidates may be defined as two inherited affine candidates, or two constructed affine candidates, or one inherited and one constructed affine candidates.
   c. Alternatively, the two normal uni-prediction affine merge candidates may be any available affine merge candidate in the list before adding virtual bi-prediction affine merge candidates.
   d. Alternatively, furthermore, the two normal uni-prediction affine merge candidates may be associated with different reference picture lists.
   e. A given order of possible combination of several merge candidates may be defined. For each combination, the two merge candidates with the given merge indices are checked whether both of them are uni-prediction. If yes, the two uni-prediction candidates may be utilized to generate the virtual bi-prediction candidate.
      i. In one example, the possible combinations are {(0,1), (0,2), (1,2) (0,3), (1, 3), (2, 3)}. Each pair indicates the merge index of two merge candidates to be checked.
      ii. In one example, the possible combinations are {(0, 1), (1, 0), (0, 2) (2,0) (1, 2) (2, 1) (0, 3) (3, 0) (1, 3) (3, 1) (2,3), (3,2)};
   f. Up to N virtual bi-prediction affine merge candidates may be derived. N may be predefined (e.g., N is 5 or 6) or it may be changed from block to block.
      i. In one example, N may be dependent on the available of inherited affine merge candidates.
   g. Pruning may be applied when inserting a new virtual bi-prediction affine merge candidate to the candidate list.
      i. In one example, a virtual bi-prediction affine merge candidate is compared to all or selective normal affine merge candidates, but not compared to another virtual bi-prediction affine merge candidate.
      ii. Alternatively, a virtual bi-prediction affine merge candidate is compared to another virtual bi-prediction affine merge candidate, but not compared to normal affine merge candidates.
7. It is proposed that a virtual uni-prediction affine merge candidate may be derived from one normal bi-prediction affine merge candidate and added to the affine merge candidate list/sub-block merge candidate list.
   a. In one example, the virtual uni-prediction affine merge candidate may be defined as directly coping the motion information of List 0 or List 1 of the normal bi-prediction affine merge candidate.

b. The normal bi-prediction affine merge candidate may be defined as the inherited affine candidates, or constructed affine candidates.
c. Alternatively, the normal bi-prediction affine merge candidates may be any available affine merge candidate in the list before adding virtual uni-prediction affine merge candidates.
d. In one example, the motion information of reference picture list 0 of the normal bi-prediction affine merge candidate is inherited as a virtual uni-prediction affine merge candidate.
e. In one example, the motion information of reference picture list 1 of the normal bi-prediction affine merge candidate is inherited as a virtual uni-prediction affine merge candidate.
f. In one example, the average of two MVs of two reference picture lists of the normal bi-prediction affine merge candidate may be average or weighted averaged and used as a virtual uni-prediction affine merge candidate.
  i. Alternatively, furthermore, the prediction direction of the virtual uni-prediction affine merge candidate is set to either List 0 or List 1.
  ii. Alternatively, the motion vector of reference picture list X of the normal bi-prediction affine merge candidate is firstly scaled to the reference picture associated with list Y (Y=1−X). The scaled MV and the MV of reference picture list Y is averaged or weighted averaged and used as a virtual uni-prediction affine merge candidate. The prediction direction of the virtual uni-prediction affine merge candidate is set to list Y.
g. More than one virtual uni-prediction affine merge candidates may be derived from one normal bi-prediction affine merge candidate.
  i. In one example, the generated virtual uni-prediction affine merge candidates using methods mentioned above may be added to the list.
h. Up to N virtual uni-prediction affine merge candidates may be derived. N may be predefined (e.g., N is 5 or 6) or it may be changed from block to block.
  i. In one example, N may be dependent on the available of inherited affine merge candidates.
i. Pruning may be applied when inserting a new virtual uni-prediction affine merge candidate to the candidate list.
  i. In one example, a virtual uni-prediction affine merge candidate is compared to all or selective normal affine merge candidates, but not compared to another virtual uni-prediction affine merge candidate.
  ii. Alternatively, a virtual uni-prediction affine merge candidate is compared to another virtual uni-prediction affine merge candidate, but not compared to normal affine merge candidates.

Regular Merge Candidate List

8. It is proposed that a virtual bi-prediction merge candidate may be derived from two normal uni-prediction merge candidates and added to the regular merge candidate list.
a. In one example, the derivation methods may be similar to what have been described in bullet 6.x (e.g., replacing 'affine merge candidate' by 'merge candidate').
b. Normal uni-prediction merge candidates may be defined as those merge candidates derived from spatial and/or temporal blocks.
c. Normal uni-prediction merge candidates may be defined as those merge candidates added to the merge candidate list before adding these virtual bi-prediction merge candidates.
d. The virtual bi-prediction merge candidate may be added to the regular merge candidate list in any position. In one example, the virtual bi-prediction merge candidate may be added before combined bi-prediction merge candidates or pairwise bi-prediction merge candidates or zero motion vector merge candidates. Alternatively, furthermore, the virtual bi-prediction merge candidate may be added before HMVP candidates.

9. It is proposed that a virtual uni-prediction merge candidate may be derived from one normal bi-prediction merge candidate and added to the regular merge candidate list.
a. In one example, the derivation methods may be similar to what have been described in bullet 7.x (e.g., replacing 'affine merge candidate' by 'merge candidate').
b. Normal uni-prediction merge candidates may be defined as those merge candidates derived from spatial and/or temporal blocks.
c. Normal uni-prediction merge candidates may be defined as those merge candidates added to the merge candidate list before adding these virtual bi-prediction merge candidates.
d. The virtual bi-prediction merge candidate may be added to the regular merge candidate list in any position. In one example, the virtual uni-prediction merge candidate may be added before combined bi-prediction merge candidates or pairwise bi-prediction merge candidates or zero motion vector merge candidates.
e. Alternatively, furthermore, the virtual uni-prediction merge candidate may be added before HMVP candidates.

5. EMBODIMENT 5.1 Embodiment #1: Uni-Prediction Candidate List for TPM

The uni-prediction candidate list, named TPM motion candidate list, consists of five uni-prediction motion vector candidates. It is derived from seven neighboring blocks including five spatial neighboring blocks (1 to 5) and two temporal co-located blocks (6 to 7), as shown in FIG. 14. The motion vectors of the seven neighboring blocks are collected and put into the uni-prediction candidate list according to the checking order of the 7 blocks. If the number of candidates is less than five, zero motion vector is added to the list. Motion candidates added in this list for TPM are called TPM candidates, motion information derived from spatial/temporal blocks are called regular motion candidates (including HMVP candidates).

More specifically, the following steps are involved:
1) Obtain regular motion candidates from $A_1$, $B_1$, $B_0$, $A_0$, $B_2$, Col and Col2 (corresponding to block 1-7 in FIG. 14) and/or HMVP candidates.
2) Set variable numCurrMergeCand=0
3) For each regular motion candidate and numCurrMergeCand is less than 5, the following steps are performed to add TPM candidates to the list:
   If the regular motion candidate is uni-prediction (either from List 0 or List 1), it is directly added to the merge list as an TPM candidate with numCurrMergeCand increased by 1.

If the regular motion candidate is bi-prediction, go to the next regular motion candidate. Alternatively, one or more of the following methods could be utilized.
  i. The motion information from List 0 is added to the TPM merge list (that is, modified to be uni-prediction from List 0) as a new TPM candidate and numCurrMergeCand increased by 1.
  ii. the motion information from List 1 is added to the TPM merge list (that is, modified to be uni-prediction from List 1) and numCurrMergeCand increased by 1.
  iii. The motion information of List 1 is firstly scaled to List 0 reference picture, and the average of the two MVs (one is from original List 0, and the other is the scaled MV from List 1) is added to the TPM merge list, and numCurrMergeCand increased by 1.
  iv. The motion information of List 0 is firstly scaled to List 1 reference picture, and the average of the two MVs (one is from original List 1, and the other is the scaled MV from List 0) is added to the TPM merge list, and numCurrMergeCand increased by 1.
4) If numCurrMergeCand is less than 5, zero motion vector candidates are added.

It should be noted that different spatial/temporal blocks and/or different checking orders may be used to derive regular motion candidates.

It should also be noted, when adding a new TPM candidate, partial/full pruning to previously added TPM candidates may be invoked.

Figure 26:
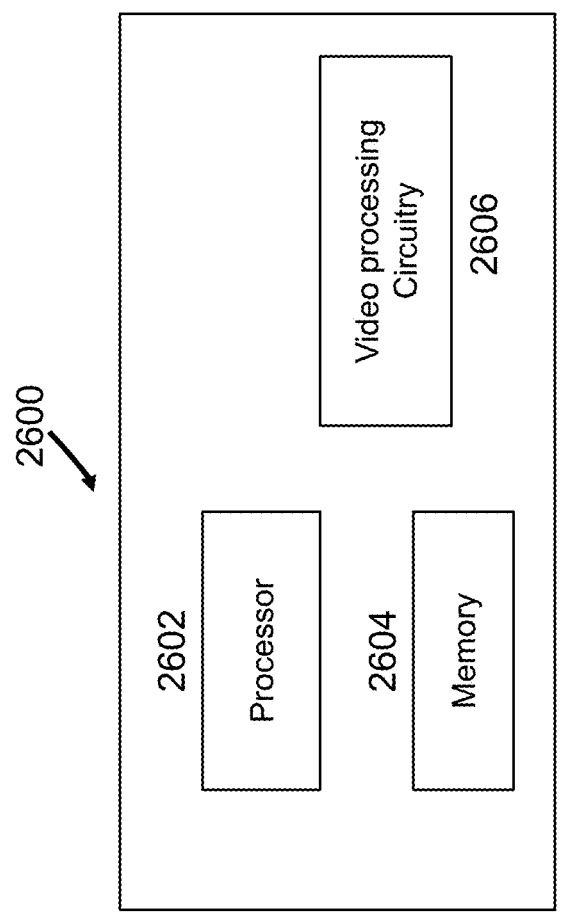
FIG. 26 is a block diagram of an example of a video processing apparatus.

FIG. 26 is a block diagram of a video processing apparatus 2600. The apparatus 2600 may be used to implement one or more of the methods described herein. The apparatus 2600 may be embodied in a smartphone, tablet, computer, Internet of Things (IoT) receiver, and so on. The apparatus 2600 may include one or more processors 2602, one or more memories 2604 and video processing hardware 2606. The processor(s) 2602 may be configured to implement one or more methods described in the present document. The memory (memories) 2604 may be used for storing data and code used for implementing the methods and techniques described herein. The video processing hardware 2606 may be used to implement, in hardware circuitry, some techniques described in the present document.

Figure 27:
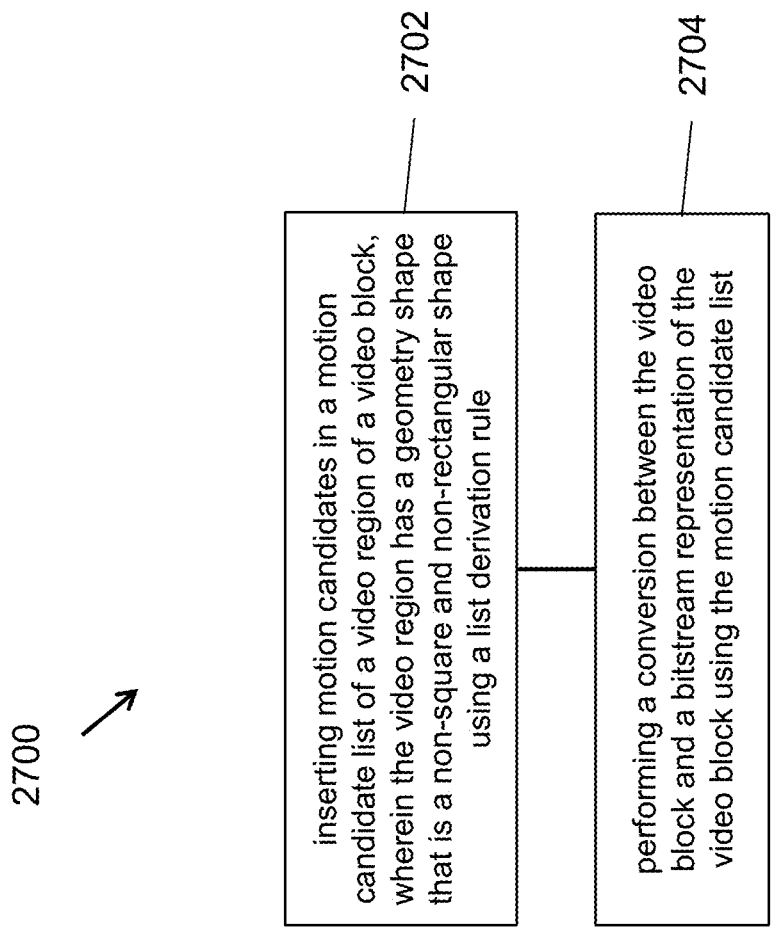
FIG. 27 is a flowchart for an example of a video processing method.

FIG. 27 is a flowchart for an example method 2700 of video processing. The method includes inserting (2702) motion candidates in a motion candidate list of a video region of a video block using a list derivation rule, wherein the video region has a geometry shape that is a non-square and non-rectangular shape and performing (2704) a conversion between the video block and a bitstream representation of the video block using the motion candidate list.

The list derivation rule may include one or more of the following sub-rules: rule 1: generating uni-prediction motion candidates from bi-prediction regular motion candidates using a non-scaled averaging, rule 2: generating motion candidates by scanning a list of regular motion candidates at most M times, where M is an integer less than 4; rule 3: performing a pruning step during the inserting wherein the pruning step is aligned with another pruning step performed for a second video block which is coded with non-geometry partitions; rule 4: performing a partial pruning step during the inserting, wherein the partial pruning limits comparison with less than all available motion candidates for the partial pruning step.

Figure 28:
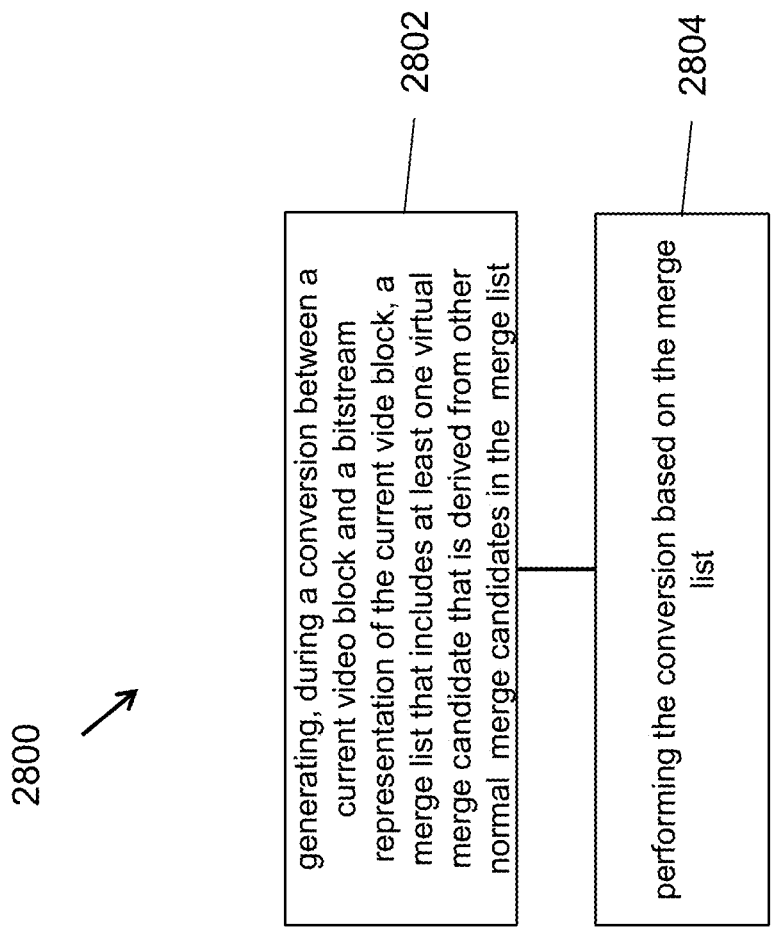
FIG. 28 is a flowchart for another example of a video processing method.

FIG. 28 is a flowchart for another example method 2800 of video processing. The method includes generating (2802), during a conversion between a current video block and a bitstream representation of the current vide block, a merge list that includes at least one virtual merge candidate that is derived from other normal merge candidates in the merge list; and performing (2804) the conversion based on the merge list.

The at least one virtual merge candidate include one or more selected from a group consisting of: a) a virtual bi-prediction merge candidate that is derived from two normal uni-prediction merge candidates; b) a virtual uni-prediction merge candidate that is derived from one normal bi-prediction merge candidate.

Figure 29:
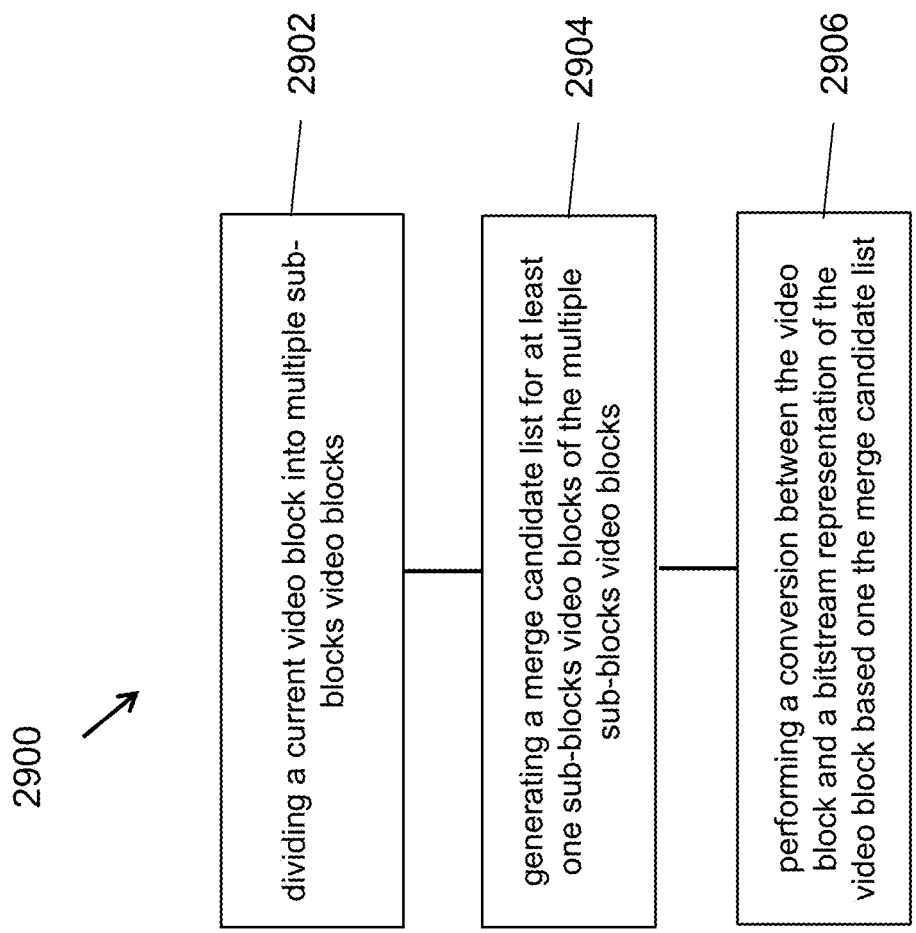
FIG. 29 is a flowchart for still another example of a video processing method.

FIG. 29 is a flowchart for still another example method 2900 of video processing. The method includes dividing (2902) a current video block into multiple sub-blocks video blocks; generating (2904) a merge candidate list for at least one sub-blocks video blocks of the multiple sub-blocks video blocks; and performing (2906) a conversion between the video block and a bitstream representation of the video block based one the merge candidate list.

In one embodiment, the merge candidate list comprises at least one merge candidate with multi-hypothesis mode.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

It will be appreciated that several techniques have been disclosed that will benefit video encoder and decoder embodiments incorporated within video processing devices such as smartphones, laptops, desktops, and similar devices by allowing the use of virtual motion candidates that are constructed based on various rules disclosed in the present document.

Some embodiments may be described using the following clause-based format.

Clause 1. A video processing method, comprising: inserting motion candidates in a motion candidate list of a video region of a video block using a list derivation rule, wherein the video region has a geometry shape that is a non-square and non-rectangular shape; and performing a conversion between the video block and a bitstream representation of the video block using the motion candidate list; wherein the list derivation rule comprises one or more selected from a group consisting of: rule 1: generating uni-prediction motion candidates from bi-prediction regular motion candidates using a non-scaled averaging; rule 2: generating motion candidates by scanning a list of regular motion candidates at most M times, where M is an integer less than 4; rule 3: performing a pruning step during the inserting wherein the pruning step is aligned with another pruning step performed for a regular motion candidate list for a second video block which is coded with non-geometry partitions; rule 4: performing a partial pruning step during the inserting, wherein the partial pruning limits comparison with less than all available motion candidates for the partial pruning step.

Clause 2. The method of clause 1, wherein the conversion comprises generating pixel values of the video block from the bitstream representation.

Clause 3. The method of clause 1, wherein the conversion comprises generating the bitstream representation from pixel values of the video block.

Clause 4. The method of clause 1, wherein the corresponding uni-prediction motion candidate is generated without comparing a slice quantization parameter of a reference picture of list 0 to that of list 1.

Clause 5. The method of any of clauses 1-3, wherein in the rule 2, M=1 or M=2.

Clause 6. The method of any of clauses 1-3 or 5, wherein the list derivation rule further specifies an order of insertion of motion candidates in the motion candidate list, wherein the order comprises: a) a first order for checking spatial regular motion candidates for the motion candidate list of the video region is different from that for a merge list for a second video block which is coded with non-geometry partitions, or b) a second order for checking spatial regular motion candidates and temporal regular motion candidates for the motion candidate list of the video region is different from that for a merge list for a second video block which is coded with non-geometry partitions, or c) a third order for checking temporal, spatial and history-based motion vector prediction (HMVP) regular motion candidates for the video region is same as that for a merge list for a second video block which is coded with non-geometry partitions.

Clause 7. The method of any of clauses 1-3 or -5-6, wherein the list derivation rule further specifies to directly insert a uni-prediction regular motion candidate to the motion candidate list.

Clause 8. The method of any of clauses 1-3 or 5-7, wherein the list derivation rule further specifies not to insert a bi-prediction regular motion candidate to the motion candidate list.

Clause 9. The method of any of clauses 1-3 or 5-8, wherein the list derivation rule further includes: deriving one uni-prediction candidate from a bi-prediction regular motion candidate, and inserting the derived one uni-prediction candidate to the motion candidate list.

Clause 10. The method of any of clauses 1-3 or 5-8, wherein the list derivation rule further includes: deriving a plurality of uni-prediction candidates from a bi-prediction regular motion candidate, and inserting the derived plurality of uni-prediction candidates to the motion candidate list.

Clause 11. The method of clause 9 or 10, wherein the one or plurality of uni-prediction candidates are derived from the bi-prediction regular motion candidate based on an average or weighted average of two motion vectors for two reference picture lists, and either of the two reference picture lists is used as a prediction direction for deriving the one or plurality of uni-prediction candidates.

Clause 12. The method of clause 5, wherein M=2, and wherein a first scan is for all uni-prediction regular motion candidates and a second scan is for all bi-prediction regular motion candidates, or, the first scan is for all bi-prediction regular motion candidates and the second scan is for all uni-prediction regular motion candidates.

Clause 13. The method of clause 1 to 12, wherein the list derivation rule further includes: in addition to candidates derived from regular motion candidates associated with spatial or temporal blocks, adding other kinds of candidates to the motion candidate list.

Clause 14. The method of clause 13, wherein the other kinds candidates include a candidate derived from an available candidate in the motion candidate list.

Clause 15. The method of any of clauses 1-3, wherein the rule corresponds to rule 3, wherein the pruning step and the another pruning step both include comparing motion vectors and reference picture indices.

Clause 16. The method of any of clauses 1-3, wherein the rule corresponds to rule 3, wherein the pruning step and the another pruning step both include comparing motion vectors and picture order count of candidate motion vectors.

Clause 17. The method of any of clauses 1-3, wherein the rule corresponds to rule 4, and wherein the pruning step includes selecting an existing entry, with which a candidate motion vector to be added is compared, in the candidate motion list based on a position from where the candidate motion vector is derived.

Clause 18. The method of any of clauses 1-3, wherein the rule corresponds to rule 4, and wherein the pruning step includes selecting an existing entry, with which a candidate motion vector to be added is compared, in the candidate motion list based on an index of the existing entry.

Clause 19. The method of any of clauses 1-3, wherein the rule corresponds to rule 4, and wherein the pruning step includes selectively comparing a candidate motion vector with an existing entry in the candidate motion list based on types of the candidate motion vector and the existing entry.

Clause 20. The method of clause 19, wherein the candidate motion vector is not compared with the existing entry in the candidate motion list in case types of the candidate motion vector and the existing entry in the candidate motion list are both truncated uni-predicted candidates.

Clause 21. The method of clause 19 or 20, wherein the candidate motion vector is compared with the existing entry in the candidate motion list in case types of the candidate motion vector and the existing entry in the candidate motion list are both originally uni-predicted candidates.

Clause 22. The method of any of clauses 1-3, wherein a pruning step is invoked between regular merge candidates in advance, and the pruning step is not performed when adding a candidate motion vector derived from the regular merge candidates.

Clause 23. A method of video processing, comprising: generating, during a conversion between a current video block and a bitstream representation of the current vide block, a merge list that includes at least one virtual merge candidate that is derived from other normal merge candidates in the merge list; and performing the conversion based on the merge list; wherein the at least one virtual merge candidate include one or more selected from a group consisting of: a) a virtual bi-prediction merge candidate that is derived from two normal uni-prediction merge candidates; b) a virtual uni-prediction merge candidate that is derived from one normal bi-prediction merge candidate.

Clause 24. The method of clause 23, wherein the conversion comprises generating pixel values of the video block from the bitstream representation.

Clause 25. The method of clause 24, wherein the conversion comprises generating the bitstream representation from pixel values of the video block.

Clause 26. The method of any of clauses 23-25, wherein the virtual bi-prediction merge candidate that is derived from two normal uni-prediction merge candidates, is derived by directly copying motion information of the two normal uni-prediction merge candidates.

Clause 27. The method of any of clauses 23-25, wherein the two normal uni-prediction merge candidates include two inherited candidates, or two constructed candidates, or one inherited and one constructed candidate.

Clause 28. The method of any of clauses 23-25, wherein the two normal uni-prediction merge candidates comprise any merge candidate already available in the merge list.

Clause 29. The method of any of clauses 23-25, wherein the two normal uni-prediction merge candidates are associated with different reference picture lists.

Clause 30. The method of any of clauses 23-25, wherein the virtual bi-prediction merge candidates is generated using a given order of possible combination of several normal merge candidates.

Clause 31. The method of clause 30, further comprising: checking, whether both of two merge candidates with given merge indices for each combination are uni-prediction candidates, and if yes, generating the virtual bi-prediction candidate based on the two uni-prediction candidates.

Clause 32. The method of clause 30 or 31, wherein the given order is: an order of merge index pairs of the two merge candidates to be checked: {(0,1), (0,2), (1,2) (0,3), (1, 3), (2, 3)}; or an order of merge index pairs of the two merge candidates to be checked: {(0, 1), (1, 0), (0, 2) (2,0) (1, 2) (2, 1) (0, 3) (3, 0) (1, 3) (3, 1) (2,3), (3,2)}.

Clause 33. The method of any of clauses-23-25, wherein the at least one merge candidate includes up to N virtual bi-prediction merge candidates, where N is an integer, and N is predefined or block specific.

Clause 34. The method of clause 33, wherein N is predefined and is 5 or 6; or N is block specific and dependent on the availability of inherited merge candidates.

Clause 35. The method of any of clauses 23-25, wherein the virtual bi-prediction merge candidate is derived using a pruning step.

Clause 36. The method of clause 35, wherein the pruning includes comparing the virtual bi-prediction merge candidate with a selected set of normal merge candidates or all normal merge candidates, wherein the virtual bi-prediction merge candidate is not compared to another virtual bi-prediction merge candidate.

Clause 37. The method of clause 35, wherein the pruning includes comparing the virtual bi-prediction merge candidate with another virtual bi-prediction merge candidate, wherein the virtual bi-prediction merge candidate is not compared to normal merge candidates.

Clause 38. The method of any of clauses 23-25, wherein the virtual uni-prediction merge candidate that is derived from one normal bi-prediction merge candidate, is derived by directly copying the motion information of the one normal bi-prediction merge candidate.

Clause 39. The method of any of clauses-23-25, wherein the one normal bi-prediction merge candidate is an inherited candidate or a constructed candidate.

Clause 40. The method of any of clauses 23-25, wherein the one normal bi-prediction merge candidate is any available merge candidate already available in the merge list.

Clause 41. The method of any of clauses 23-25, wherein the one normal bi-prediction merge candidate is inherited from either of two reference picture lists.

Clause 42. The method of any of clauses 23-25, wherein the virtual uni-prediction merge candidate that is derived from one normal bi-prediction merge candidate based on an average or weighted average of two motion vectors for two reference picture lists.

Clause 43. The method of clause 42, wherein a prediction direction of the virtual uni-prediction merge candidate is set to either of the two reference picture lists.

Clause 44. The method of clause of any of clauses 23-25 and 42, further comprising: scaling a motion vector of one of the two reference picture lists of the normal bi-prediction merge candidate to a reference picture associated with other one of the two reference picture lists; averaging or weighted averaging the scaled motion vector and that of the other one of the two reference picture lists, and the resulted motion vector is used as the virtual uni-prediction merge candidate, wherein a prediction direction of the virtual uni-prediction merge candidate is set to the other one of the two reference picture lists.

Clause 45. The method of any of clauses 23-25, wherein the at least some merge candidates include more than one virtual uni-prediction candidates derived from one normal bi-prediction merge candidate, and inserting the derived plurality of uni-prediction candidates to the motion candidate list.

Clause 46. The method of any of clauses 23-25, wherein the at least some merge candidates include up to N virtual uni-prediction merge candidates, where N is an integer, and N is predefined or block-specific.

Clause 47. The method of clause 46, wherein N is predefined and N is 5 or 6; or N is block-specific and N is dependent on the availability of inherited merge candidates.

Clause 48. The method of any of clauses 23-25, wherein the virtual uni-prediction merge candidate is derived using a pruning step.

Clause 49. The method of clause 48, wherein the pruning includes comparing the virtual uni-prediction merge candidate with a selected set of normal merge candidates or all normal merge candidates, wherein the virtual uni-prediction merge candidate is not compared to another virtual uni-prediction merge candidate.

Clause 50. The method of clause 48, wherein the pruning includes comparing the virtual uni-prediction merge candidate with another virtual uni-prediction merge candidate, wherein the virtual uni-prediction merge candidate is not compared to normal merge candidates.

Clause 51. The method of any of clauses 23-25, wherein the normal uni-prediction merge candidates are derived from spatial or temporal blocks.

Clause 52. The method of any of clauses 23-25, wherein the normal uni-prediction merge candidates are those merge candidates added to the merge candidate list before adding the virtual bi-prediction merge candidate.

Clause 53. the method of clause 52, wherein the generating the merge list comprises: adding the virtual bi-prediction merge candidate before combined bi-prediction merge candidates; or before pairwise bi-prediction merge candidates; or before zero motion vector merge candidates; or before history-based motion vector prediction (HMVP) candidates.

Clause 54. The method of any of clauses 23-25, wherein the normal bi-prediction merge candidates are derived from spatial or temporal blocks.

Clause 55. The method of any of clauses 23-25, wherein the normal bi-prediction merge candidates are those merge candidates added to the merge candidate list before adding the virtual uni-prediction merge candidate.

Clause 56. the method of clause 55, wherein the generating the merge list comprises: adding the virtual uni-prediction merge candidate before combined bi-prediction merge candidates; or before pairwise bi-prediction merge candidates; or before zero motion vector merge candidates; or before history-based motion vector prediction (HMVP) candidates.

Clause 57. The method of any of clauses 23 to 50, wherein the merge list is an affine merge list and the merge candidate is an affine merge candidate.

Clause 58. The method of any of clauses 23 to 57, wherein the merge list is a regular merge list and the merge candidate is a regular merge candidate.

Clause 59. A video decoding apparatus comprising a processor configured to implement a method recited in one or more of clauses 1 to 58.

Clause 60. A video encoding apparatus comprising a processor configured to implement a method recited in one or more of clauses 1 to 58.

Clause 61. A computer program product having computer code stored thereon, the code, when executed by a processor, causes the processor to implement a method recited in any of clauses 1 to 58.

Clause 62. A method, apparatus or system described in the present document.

Clause 2-1. A method of video processing, comprising: dividing a current video block into multiple sub-blocks video blocks; generating a merge candidate list for at least one sub-blocks video blocks of the multiple sub-blocks video blocks; and performing a conversion between the video block and a bitstream representation of the video block based one the merge candidate list; wherein the merge candidate list comprises at least one merge candidate with multi-hypothesis mode.

Clause 2-2. The method of clause 2-1, wherein the conversion comprises generating pixel values of the video block from the bitstream representation.

Clause 2-3. The method of clause 2-1, wherein the conversion comprises generating the bitstream representation from pixel values of the video block.

Clause 2-4. The method of any of clauses 1-3, wherein the bitstream representation includes an indication that the multiple hypothesis mode is used for the at least one sub-block.

Clause 2-5. The method of any of clauses 1-3, wherein the at least one merge candidate with multi-hypothesis mode includes a merge candidate calculated by jointly utilizing a coding of a block for two uni-predication merge candidates.

Clause 2-6. The method of clause 2-5, wherein one of the two uni-predication merge candidates is an alternative temporal motion vector prediction (ATMVP) candidate, and the other is an affine merge candidate.

Clause 2-7. The method of clause 2-5, wherein the two uni-predication merge candidates are both affine merge candidates.

Clause 2-8. The method of clause 2-5, wherein first two uni-predication merge candidates are selected when the multi-hypothesis mode is enabled, and selected merge indices are not signaled in the bitstream representation.

Clause 2-9. The method of clause 2-5, wherein selected merge indices are signaled in the bitstream representation.

Clause 2-10. The method of clause 2-5, wherein the multi-hypothesis mode is enabled for certain block dimensions and disabled for other kinds of dimensions.

Clause 2-11. The method of clause 2-4, wherein the indication is based on a flag that is included dependent on a height or a width of the video block as one of the following:
    i. the flag is not signaled if w>Tw and h>Th. e.g. Tw=Th=32;
    ii. the flag is not signaled if w>Tw or h>Th. e.g. Tw=Th=32;
    iii. the flag is not signaled if w*h>Ts. e.g. Ts=1024;
    iv. the flag is not signaled if w<Tw and h<Th. e.g. Tw=Th=16;
    v. the flag is not signaled if w<Tw or h<Th. e.g. Tw=Th=16;
    vi. The flag is not signaled if w*h<Ts. e.g. Ts=256, where w, h, Tw, Th, Ts are integers.

Clause 2-12. A video decoding apparatus comprising a processor configured to implement a method recited in one or more of clauses 2-1 to 2-11.

Clause 2-13. A video encoding apparatus comprising a processor configured to implement a method recited in one or more of clauses 2-1 to 2-11.

Clause 2-14. A computer program product having computer code stored thereon, the code, when executed by a processor, causes the processor to implement a method recited in any of clauses 2-1 to 2-11.

Clause 2-15. A method, apparatus or system described in the present document.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of processing video data, comprising:
   dividing a current video block into multiple sub-blocks;
   generating a merge candidate list for at least one sub-block of the multiple sub-blocks; and
   performing a conversion between the video block and a bitstream of the video block based on the merge candidate list,
   wherein the merge candidate list comprises at least one merge candidate with multi-hypothesis mode;
   the at least one merge candidate with multi-hypothesis mode includes a merge candidate calculated by jointly utilizing two uni-prediction merge candidates in the merge candidate list,
   wherein the two uni-prediction merge candidate are selected from the merge candidate list by considering candidate types of candidates in the merge candidate list;
   wherein one of the two uni-prediction merge candidates is a sub-block based temporal motion vector prediction candidate, and the other is an affine merge candidate, or the two uni-prediction merge candidates are both affine merge candidates,
   wherein the bitstream includes an indication that multiple hypothesis mode is used for the at least one sub-block, and
   wherein the indication is based on a flag that is signaled dependent on a height or a width of the video block as one of the following:
   i. the flag is not signaled if w>32 and h>32;
   ii. the flag is not signaled if w>32 or h>32;
   iii. the flag is not signaled if w*h>1024;
   iv. the flag is not signaled if w<16 and h<16;
   v. the flag is not signaled if w<16 or h<16;
   vi. The flag is not signaled if w*h<256,
   where w and h are integers, w indicates the width of the video block, and h indicates the height of the video block.

2. The method of claim 1, wherein the conversion comprises generating pixel values of the video block from the bitstream.

3. The method of claim 1, wherein the conversion comprises generating the bitstream from pixel values of the video block.

4. The method of claim 1, wherein selected merge indices are signaled in the bitstream.

5. The method of claim 1, wherein the conversion includes encoding the current video block into the bitstream.

6. The method of claim 1, wherein the conversion includes decoding the current video block from the bitstream.

7. A video decoding apparatus comprising a processor configured to implement the method recited in claim 1.

8. A video encoding apparatus comprising a processor configured to implement the method recited in claim 1.

9. A non-transitory computer-readable medium having computer code stored thereon, the code, when executed by a processor, causes the processor to implement a method recited in claim 1.

10. An apparatus for processing video data comprising a processor and a non-transitory memory with instructions thereon, wherein the instructions upon execution by the processor, cause the processor to:
    divide a current video block into multiple sub-blocks;
    generate a merge candidate list for at least one sub-block of the multiple sub-blocks; and
    perform a conversion between the video block and a bitstream of the video block based on the merge candidate list,
    wherein the merge candidate list comprises at least one merge candidate with multi-hypothesis mode;
    the at least one merge candidate with multi-hypothesis mode includes a merge candidate calculated by jointly utilizing two uni-prediction merge candidates in the merge candidate list,
    wherein the two uni-prediction merge candidate are selected from the merge candidate list by considering candidate types of candidates in the merge candidate list;
    wherein one of the two uni-prediction merge candidates is a sub-block based temporal motion vector prediction candidate, and the other is an affine merge candidate, or the two uni-prediction merge candidates are both affine merge candidates, wherein the bitstream includes an indication that multiple hypothesis mode is used for the at least one sub-block, and wherein the indication is based on a flag that is signaled dependent on a height or a width of the video block as one of the following:

i. the flag is not signaled if w>32 and h>32;
ii. the flag is not signaled if w>32 or h>32;
iii. the flag is not signaled if w*h>1024;
iv. the flag is not signaled if w<16 and h<16;
v. the flag is not signaled if w<16 or h<16;
vi. The flag is not signaled if w*h<256, where w and h are integers, w indicates the width of the video block, and h indicates the height of the video block.

11. A method of storing a bitstream of a video to a computer-readable recording medium, comprising:

dividing a current video block of the video into multiple sub-blocks;

generating a merge candidate list for at least one sub-block of the multiple sub-blocks; and performing a conversion between the video block and a bitstream of the video block based on the merge candidate list, and storing the bitstream to the computer-readable medium;

wherein the merge candidate list comprises at least one merge candidate with multi-hypothesis mode;

the at least one merge candidate with multi-hypothesis mode includes a merge candidate calculated by jointly utilizing two uni-prediction merge candidates in the merge candidate list, wherein the two uni-prediction merge candidate are selected from the merge candidate list by considering candidate types of candidates in the merge candidate list;

wherein one of the two uni-prediction merge candidates is a sub-block based temporal motion vector prediction candidate, and the other is an affine merge candidate, or the two uni-prediction merge candidates are both affine merge candidates, wherein the bitstream includes an indication that multiple hypothesis mode is used for the at least one sub-block, and wherein the indication is based on a flag that is signaled dependent on a height or a width of the video block as one of the following:

i. the flag is not signaled if w>32 and h>32;
ii. the flag is not signaled if w>32 or h>32;
iii. the flag is not signaled if w*h>1024;
iv. the flag is not signaled if w<16 and h<16;
v. the flag is not signaled if w<16 or h<16;
vi. The flag is not signaled if w*h<256, where w and h are integers, w indicates the width of the video block, and h indicates the height of the video block.

12. The apparatus of claim 10, wherein selected merge indices are signaled in the bitstream.

13. The non-transitory computer-readable recording medium of claim 11, wherein selected merge indices are signaled in the bitstream.

* * * * *